US012609951B2

(12) United States Patent
Ganesh et al.

(10) Patent No.: US 12,609,951 B2
(45) Date of Patent: Apr. 21, 2026

(54) SYSTEM AND METHOD FOR GATHERING, ANALYZING, AND REPORTING GLOBAL CYBERSECURITY THREATS

(71) Applicant: Harman Connected Services, Inc., Stamford, CT (US)

(72) Inventors: Jai Ganesh, Karnataka (IN); Abhay Sudhakar Barhanpurkar, Maharashtra (IN); Rahul Chaudhari, Pune (IN)

(73) Assignee: Harman Connected Services, Inc., Stamford, CT (US)

( * ) Notice: Subject to any disclaimer, the term of this patent is extended or adjusted under 35 U.S.C. 154(b) by 233 days.

(21) Appl. No.: 18/460,152

(22) Filed: Sep. 1, 2023

(65) Prior Publication Data

US 2024/0080332 A1 Mar. 7, 2024

(30) Foreign Application Priority Data

Sep. 1, 2022 (IN) ............................. 202241049889

(51) Int. Cl.
| | |
|---|---|
| *H04L 9/40* | (2022.01) |
| *G06F 16/951* | (2019.01) |
| *G06F 21/55* | (2013.01) |
| *G06F 21/56* | (2013.01) |
| *G06F 21/57* | (2013.01) |
| *G06F 40/221* | (2020.01) |

(52) U.S. Cl.
CPC ........ *H04L 63/1425* (2013.01); *G06F 16/951* (2019.01); *G06F 21/556* (2013.01); *G06F 21/566* (2013.01); *G06F 21/577* (2013.01);

*H04L 63/1416* (2013.01); *H04L 63/1433* (2013.01); *G06F 40/221* (2020.01)

(58) Field of Classification Search
CPC ..... G06F 21/577; G06F 21/556; G06F 21/566
See application file for complete search history.

(56) References Cited

U.S. PATENT DOCUMENTS

| | | | | |
|---|---|---|---|---|
| 2020/0153763 A1* | 5/2020 | Baudart | ................. | G06N 3/006 |
| 2021/0237724 A1* | 8/2021 | Zhao | ................... | B60W 30/095 |
| 2021/0397903 A1* | 12/2021 | Raj | ......................... | H04L 67/535 |
| 2022/0337554 A1* | 10/2022 | Gattu | .................. | H04L 63/0263 |
| 2023/0054575 A1* | 2/2023 | Cohen | ................... | G06F 21/556 |
| 2023/0252568 A1* | 8/2023 | Yadav | ................... | G06Q 40/06 |
| | | | | 705/36 R |

(Continued)

*Primary Examiner* — Barbara B Anyan
(74) *Attorney, Agent, or Firm* — Finnegan, Henderson, Farabow, Garrett and Dunner LLP

(57) ABSTRACT

A system is provided for reducing a cybersecurity vulnerability of enterprise assets with a cybersecurity asset management and automation system. In one example, a method includes a receiving a first XML file from a data aggregator; receiving a second XML file from a web crawler; enter the second XML file to a natural language processing (NLP) model trained to extract topics, phrases, and entities; perform a temporal and location analysis based on the second XML file, identify an anomaly by inputting the second XML file into an anomaly detection model; perform a graph network analysis based on the first XML file to generate a graph network, perform a risk score calculation based on ensemble scoring determining a threat remediation policy, and displaying results on a display device and implement threat remediation measures based on the threat remediation policy.

8 Claims, 18 Drawing Sheets

(56)  References Cited

U.S. PATENT DOCUMENTS

| | | | | |
|---|---|---|---|---|
| 2023/0325292 A1* | 10/2023 | Ardel | ................. | G06F 11/3058 |
| 2023/0328084 A1* | 10/2023 | Narayanan | ............ | G06F 21/566 |
| | | | | 726/23 |
| 2024/0080332 A1* | 3/2024 | Ganesh | ................ | G06F 21/577 |

* cited by examiner

500

RISK SCORE
OPTIMIZATION
520

RISK SCORE
EVALUATION
518

RISK SCORE
CALCULATION
514

INITIAL RISK
SCORE MODEL
512

FEATURE
ENGINEERING
508

DATA PRE-
PROCESSING
506

516

510

502

504

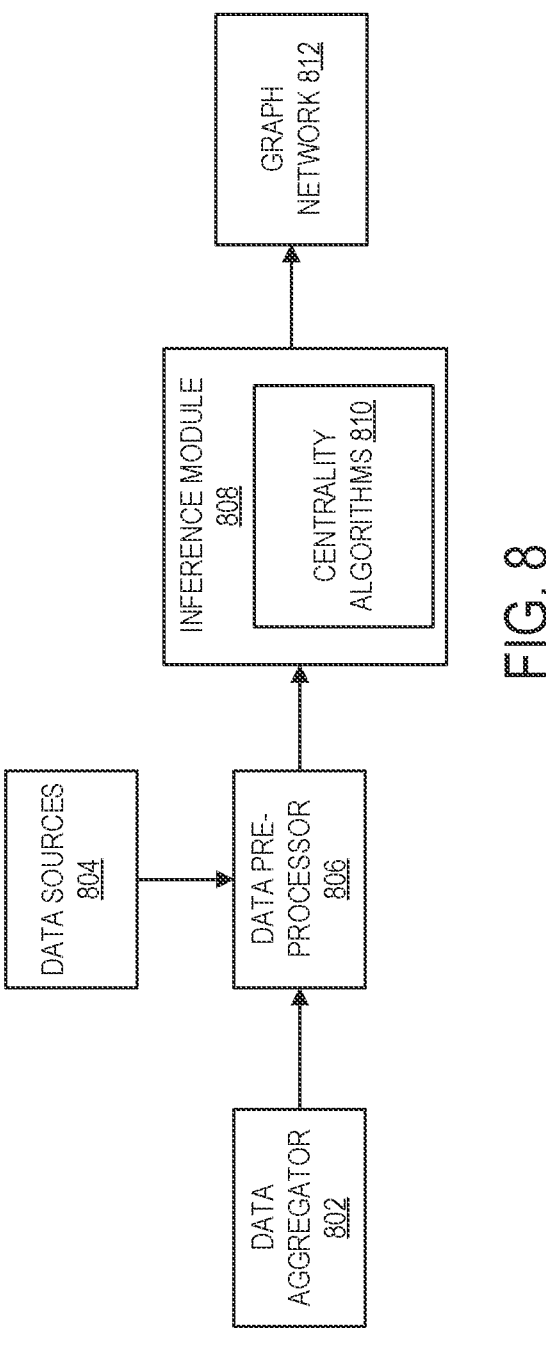
FIG. 8

900

APPLICATION USAGE 904

PROTOCOL USAGE 906

LOGIN ACTIVITIES 908

OS UPDATES 910

WEB USAGE 912

APPLICATION UPDATES 914

PORTS USAGE 916

INTERNAL DATA 902

918

920

922

DATA PRE-PROCESSOR 924

MODEL TRAINING 926

MODEL INFERENCE 928

POST-PROCESSOR 930

KPI ANALYSIS 932

MODEL RE-TRAINING ANALYSIS 934

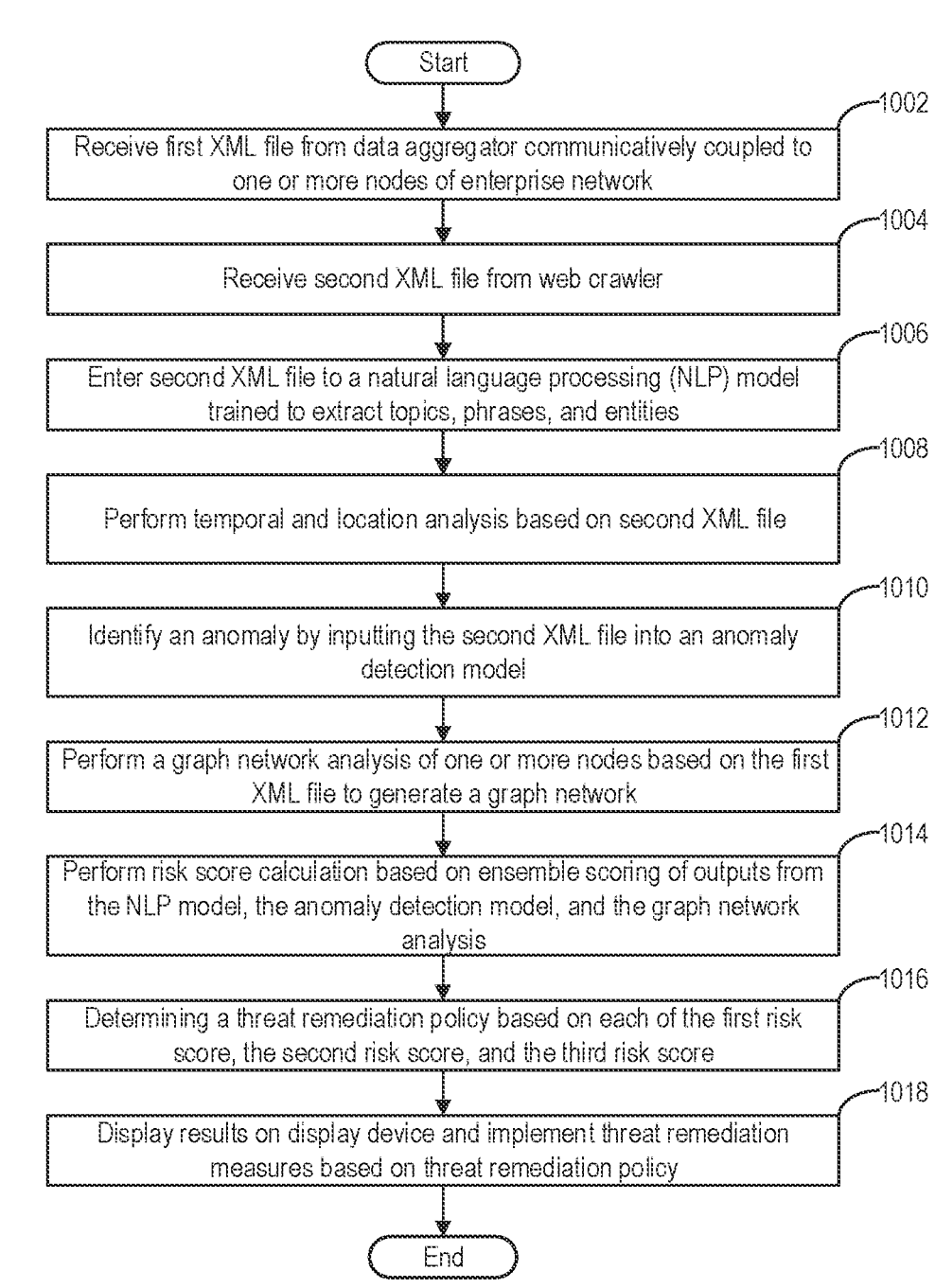

1000

Start

1002
Receive first XML file from data aggregator communicatively coupled to one or more nodes of enterprise network 1004
Receive second XML file from web crawler 1006
Enter second XML file to a natural language processing (NLP) model trained to extract topics, phrases, and entities 1008
Perform temporal and location analysis based on second XML file 1010
Identify an anomaly by inputting the second XML file into an anomaly detection model 1012
Perform a graph network analysis of one or more nodes based on the first XML file to generate a graph network 1014
Perform risk score calculation based on ensemble scoring of outputs from the NLP model, the anomaly detection model, and the graph network analysis 1016
Determining a threat remediation policy based on each of the first risk score, the second risk score, and the third risk score 1018
Display results on display device and implement threat remediation measures based on threat remediation policy End

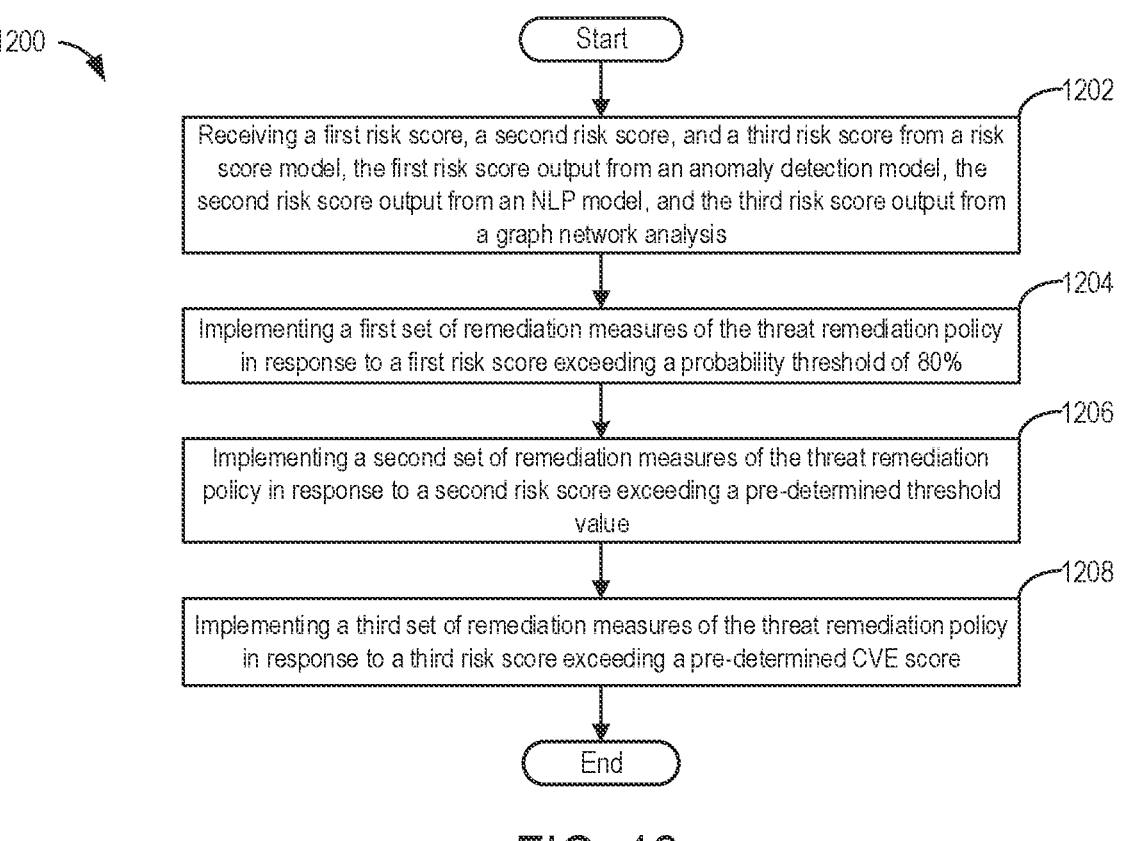

Start

Receiving a first risk score, a second risk score, and a third risk score from a risk score model, the first risk score output from an anomaly detection model, the second risk score output from an NLP model, and the third risk score output from a graph network analysis
1202

Implementing a first set of remediation measures of the threat remediation policy in response to a first risk score exceeding a probability threshold of 80%
1204

Implementing a second set of remediation measures of the threat remediation policy in response to a second risk score exceeding a pre-determined threshold value
1206

Implementing a third set of remediation measures of the threat remediation policy in response to a third risk score exceeding a pre-determined CVE score
1208

End

FIG. 12

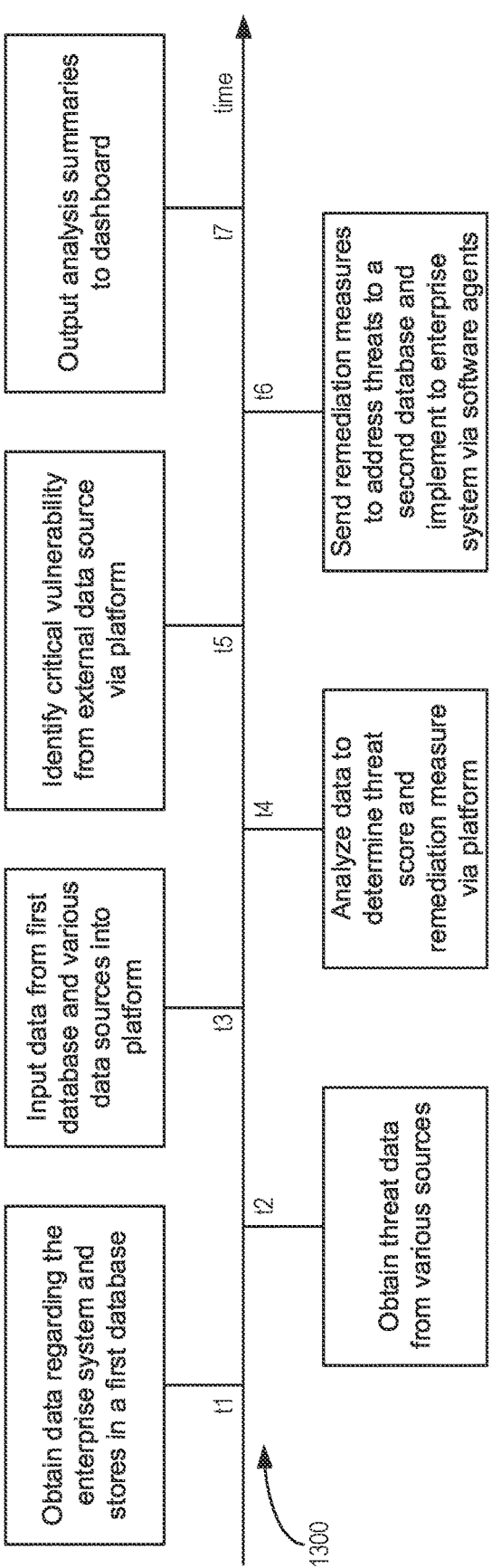

Obtain data regarding the enterprise system and stores in a first database t1

Input data from first database and various data sources into platform t3

Identify critical vulnerability from external data source via platform t5

Output analysis summaries to dashboard t7

Obtain threat data from various sources t2

Analyze data to determine threat score and remediation measure via platform t4

Send remediation measures to address threats to a second database and implement to enterprise system via software agents t6 time

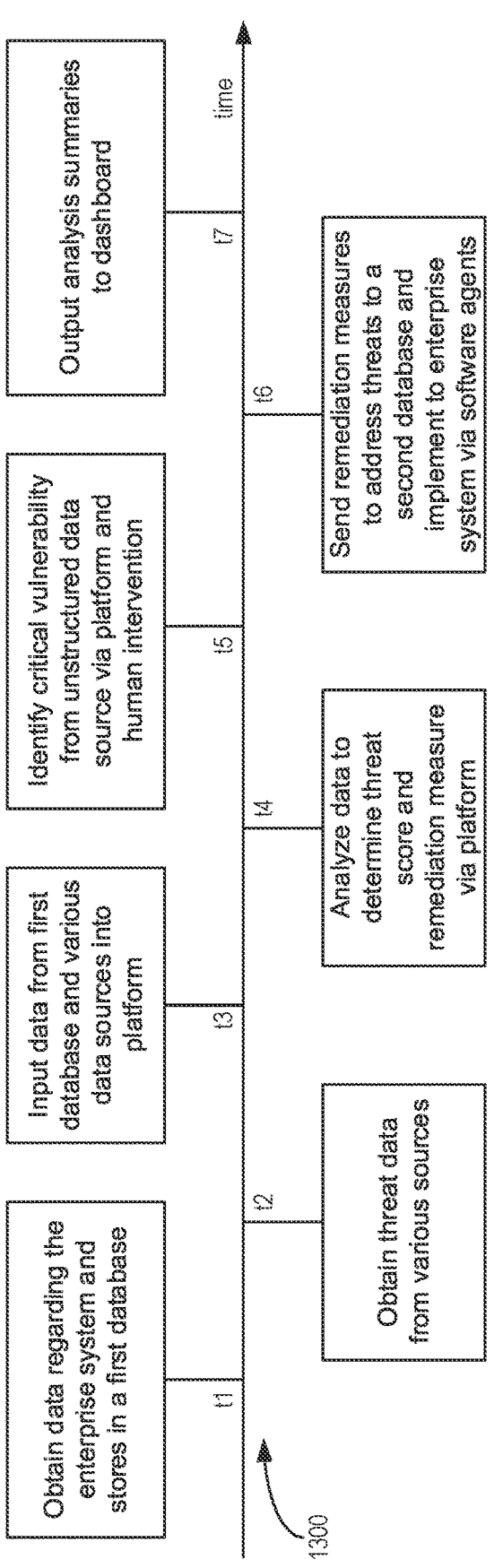

FIG. 13B

Obtain data regarding the enterprise system and stores in a first database t1

Input data from first database and various data sources into platform t3

Identify critical vulnerability from unstructured data source via platform and human intervention t5

Output analysis summaries to dashboard t7 time

Obtain threat data from various sources t2

Analyze data to determine threat score and remediation measure via platform t4

Send remediation measures to address threats to a second database and implement to enterprise system via software agents t6

1300

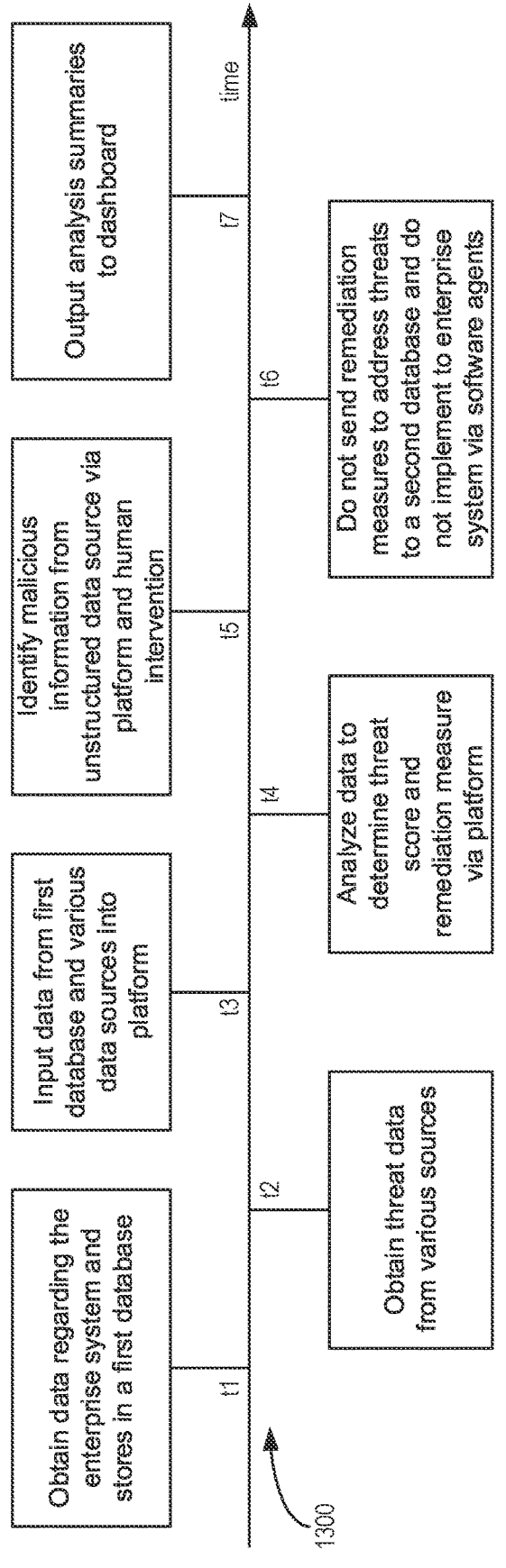

| Obtain data regarding the enterprise system and stores in a first database | Input data from first database and various data sources into platform | Identify malicious information from unstructured data source via platform and human intervention | Output analysis summaries to dashboard | t1     t2     t3     t4     t5     t6     t7 time

| Obtain threat data from various sources | Analyze data to determine threat score and remediation measure via platform | Do not send remediation measures to address threats to a second database and do not implement to enterprise system via software agents |

1300

TOOLBOX 1402

ENABLED DEVICES AREA 1404

OS TYPES AREA 1406

SCANNED DEVICES AREA 1408

VULNERABILITY STATISTICS AREA 1410

VULNERABILITY AGING AREA 1412

MACHINE COMPLIANCE AREA 1414

GRAPH NETWORK ANALYSIS AREA 1416

ANOMALY DETECTION AREA 1418

SYSTEM AND METHOD FOR GATHERING, ANALYZING, AND REPORTING GLOBAL CYBERSECURITY THREATS

CROSS-REFERENCE TO RELATED APPLICATIONS

The present application claims priority to Indian Patent Application No. 202241049889, entitled "SYSTEM AND METHOD FOR GATHERING, ANALYZING, AND REPORTING GLOBAL CYBERSECURITY THREATS", and filed on Sep. 1, 2022. The entire contents of the above-listed application is hereby incorporated by reference for all purposes.

BACKGROUND

The amount of cybersecurity threats is increasing exponentially, which presents challenges for enterprises that want to monitor enterprise assets, analyze activity of the enterprise assets, report on identified cybersecurity vulnerabilities and threats, and take preventive action against cybersecurity threats. In particular, to protect enterprise data, cybersecurity systems may have the computational capacity and ability to identify and address an influx of cybersecurity threats. As such, the development of a cybersecurity system with an ability to extract relevant information from cybersecurity threat data may reduce a frequency of cybersecurity events and may protect enterprise assets from cybersecurity attacks.

SUMMARY

The current disclosure at least partially addresses one or more of the above identified issues by a system for cybersecurity asset management and automation, the system comprising a user input device, a display device, a processor, a non-transitory memory storing instructions that when executed, cause the processor to receive a first XML file from a data aggregator communicatively coupled to one or more nodes of an enterprise network, receive a second XML file from a web crawler, enter the second XML file to a natural language processing (NLP) model trained to extract topics, phrases, and entities, perform a temporal and location analysis based on the second XML file, identify an anomaly by inputting the second XML file into an anomaly detection model, perform a graph network analysis of the one or more nodes based on the first XML file to generate a graph network, perform a risk score calculation based on ensemble scoring of outputs from the NLP model, the anomaly detection model, and the graph network analysis, the risk score calculation comprising generating a first risk score for the anomaly detection model, a second risk score for the NLP model, and a third score for the graph network analysis.

The cybersecurity asset management and automation system may extract relevant cybersecurity threat data and implements remediation measures in response to cybersecurity vulnerabilities to ensure security standards are enforced and to enable enterprises to comply with the security standards.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The disclosure may be better understood from reading the following description of non-limiting embodiments, with reference to the attached drawings, wherein below:

FIG. 8 shows a process for training an anomaly detection model;

FIG. 10 shows an exemplary method for identifying cybersecurity threats and implementing remediation measures with a cybersecurity intelligence and asset management system;

FIG. 12 shows an exemplary method for implementing remediation measures of a threat remediation policy based on a calculated risk score;

FIG. 13A, FIG. 13B, and FIG. 13C show pictorial diagrams of a timeline for addressing threats via a cybersecurity intelligence and asset management system;

DETAILED DESCRIPTION

Figure 1:
FIG. 1 shows an example networked computing environment, in accordance with one or more embodiments of the present disclosure.
Figure 2:
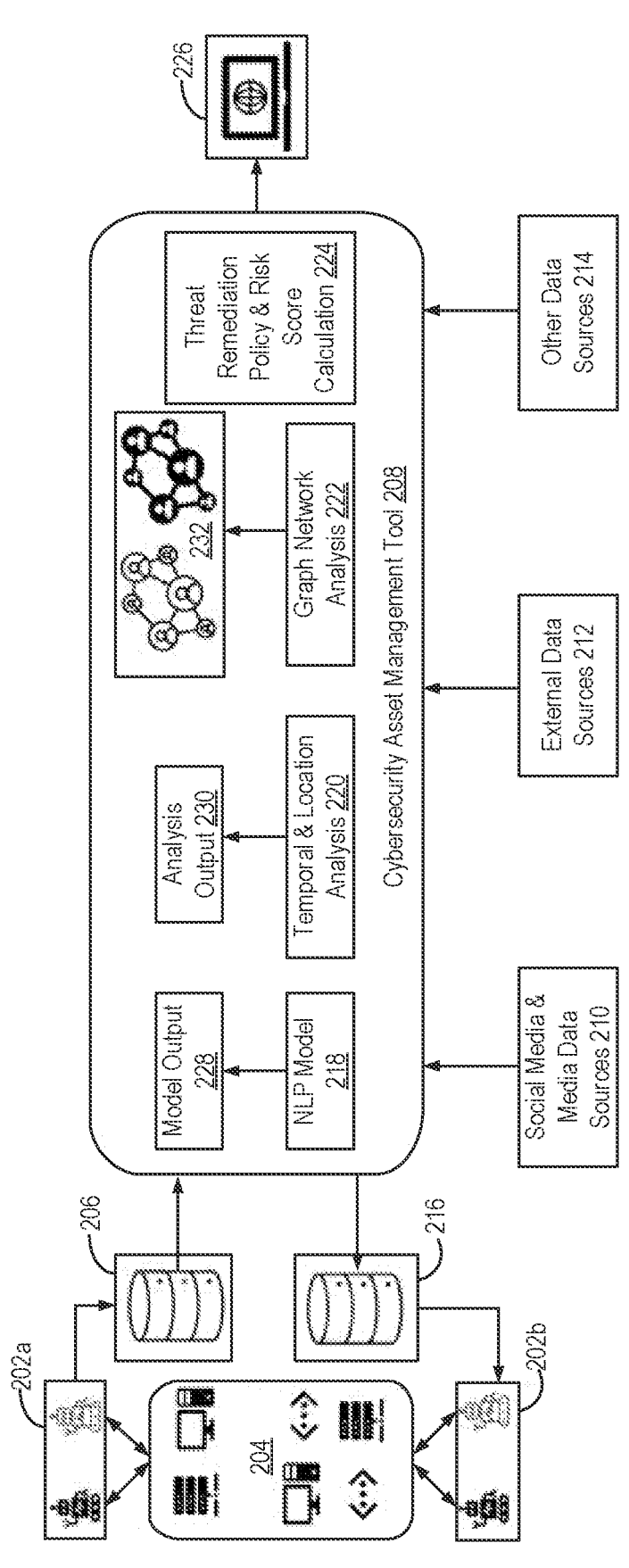
FIG. 2 shows a schematic block diagram of a cybersecurity intelligence and asset management platform.
Figure 3:
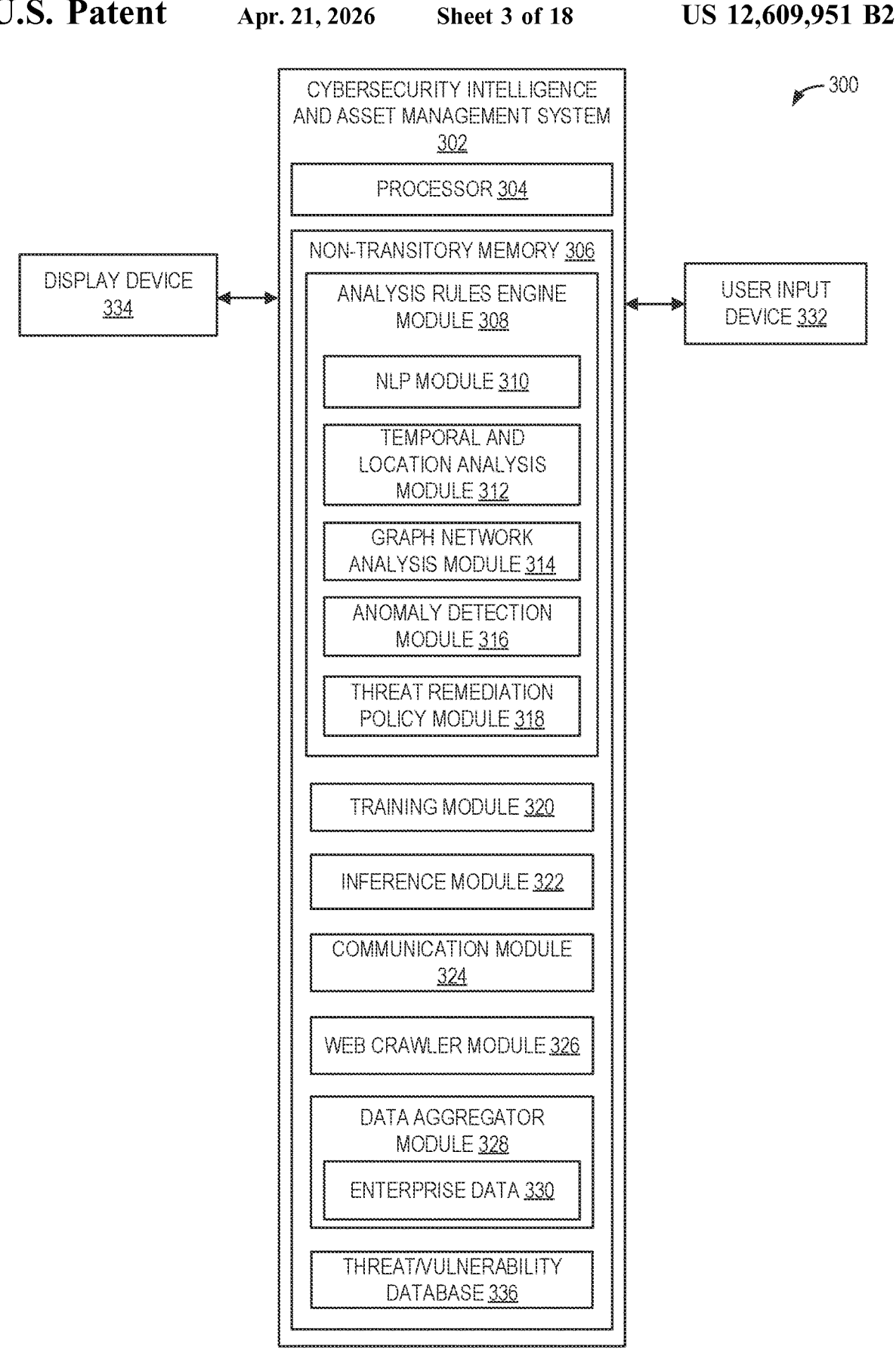
FIG. 3 shows an example cybersecurity intelligence and asset management platform.
Figure 4:
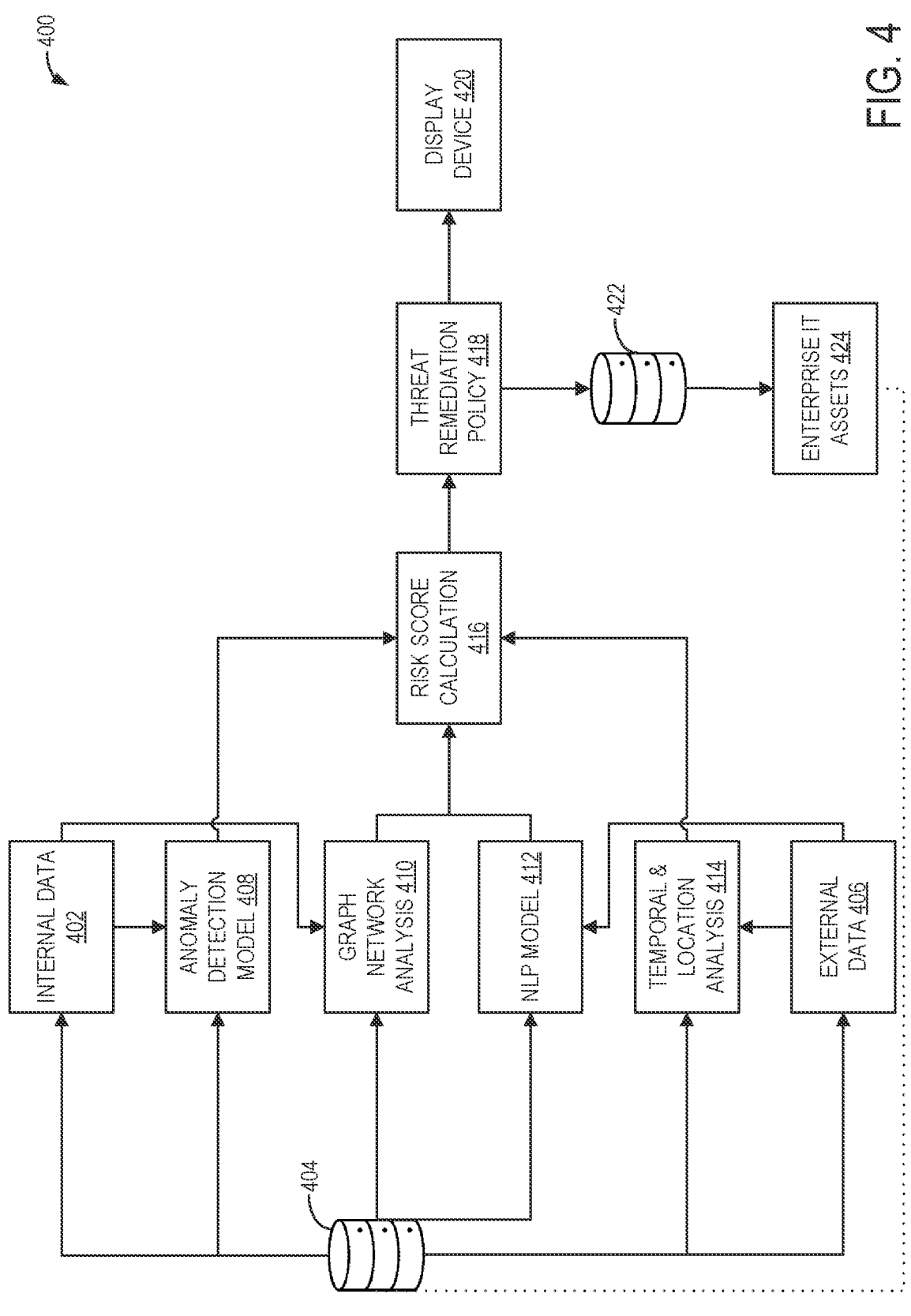
FIG. 4 shows a schematic block diagram for processing data from various data sources in a cybersecurity intelligence and asset management system.
Figure 5A:
FIG. 5A shows an example process for training a risk score model based on ensemble scoring and FIG. 5B shows a process for deploying the risk score model.
Figure 5B:
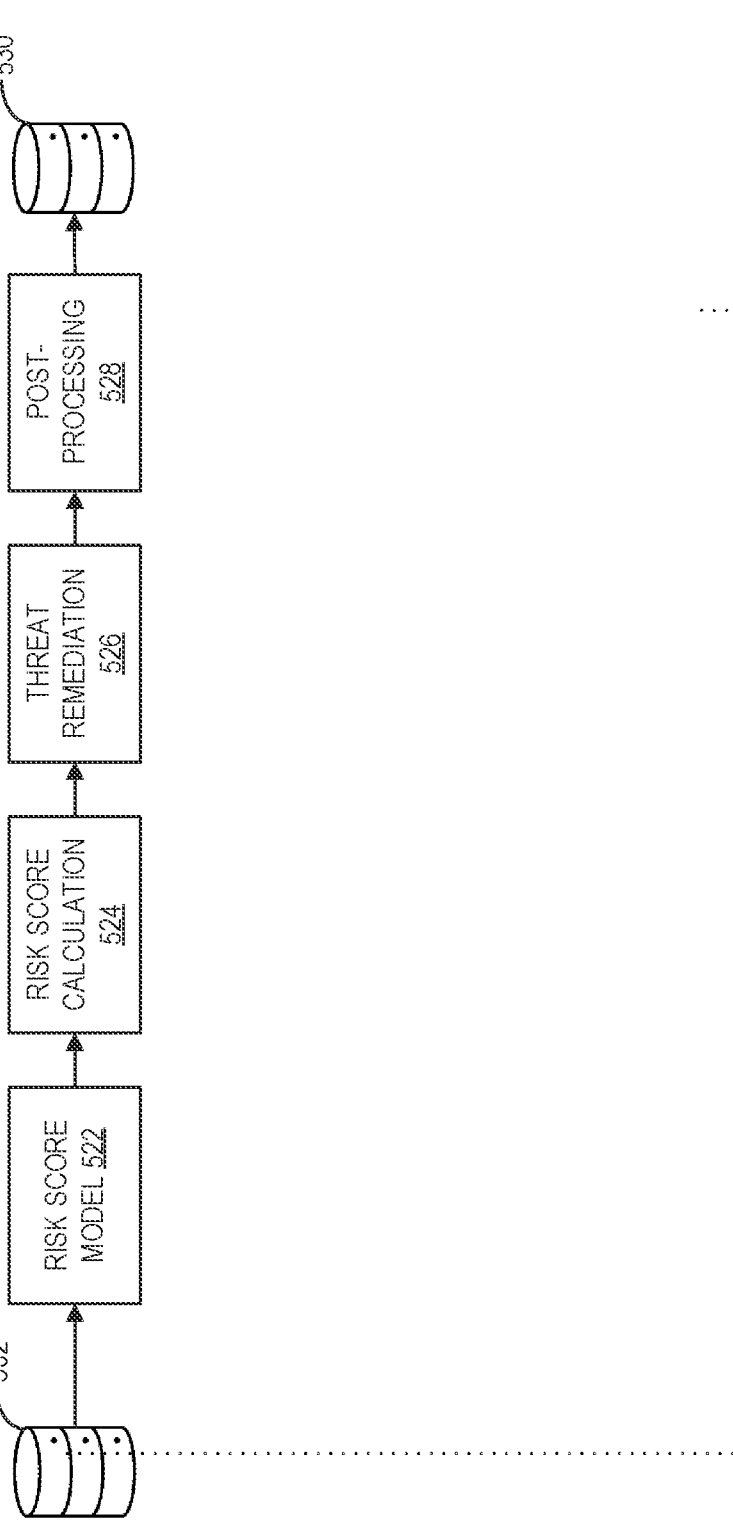
Figure 6:
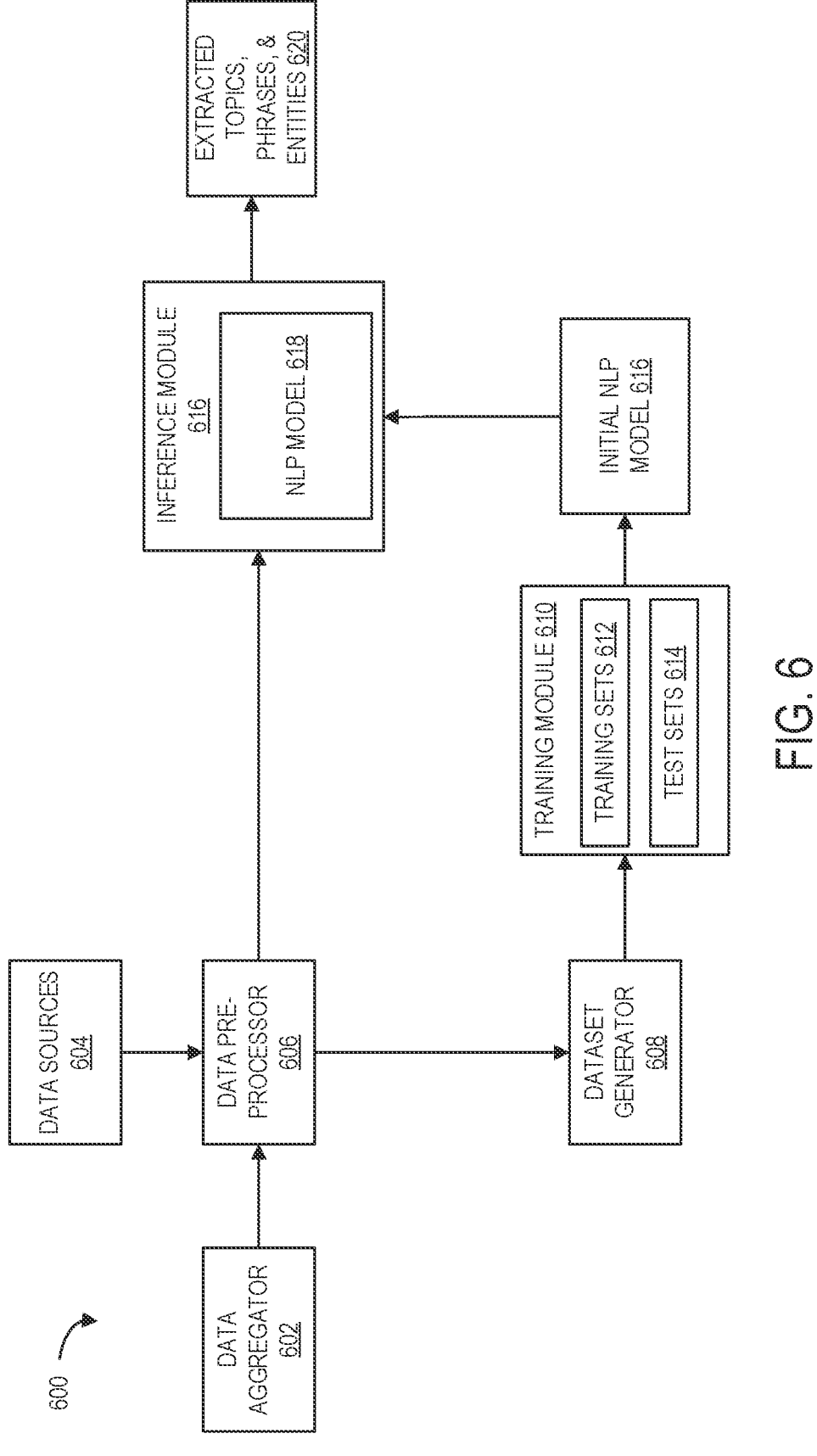
FIG. 6 shows an example process for training and re-training an anomaly detection model.
Figure 7:
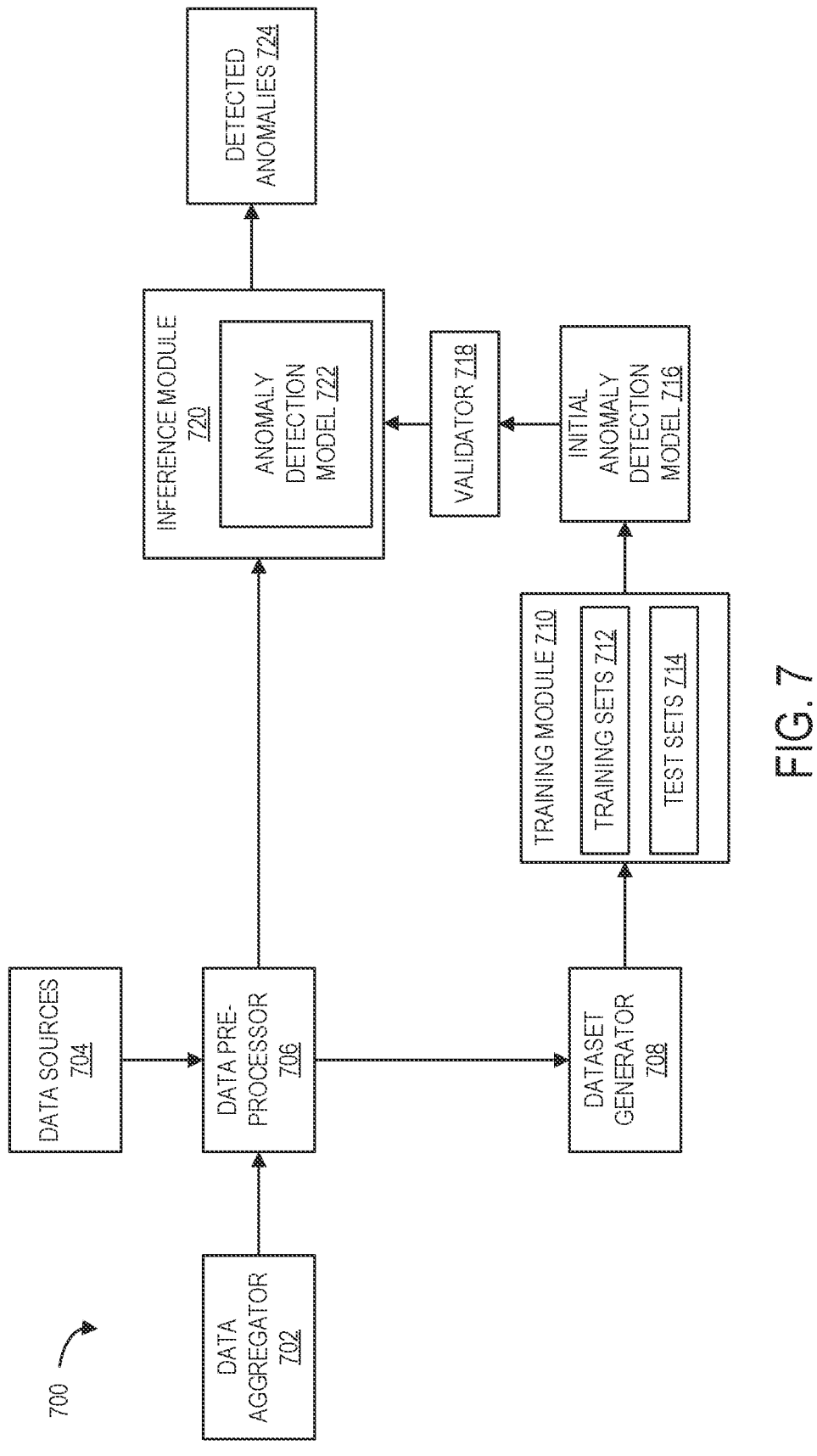
FIG. 7 shows a process for training a natural language processing (NLP)
Figure 9:
FIG. 9 shows a process for generating a network graph.
Figure 11:
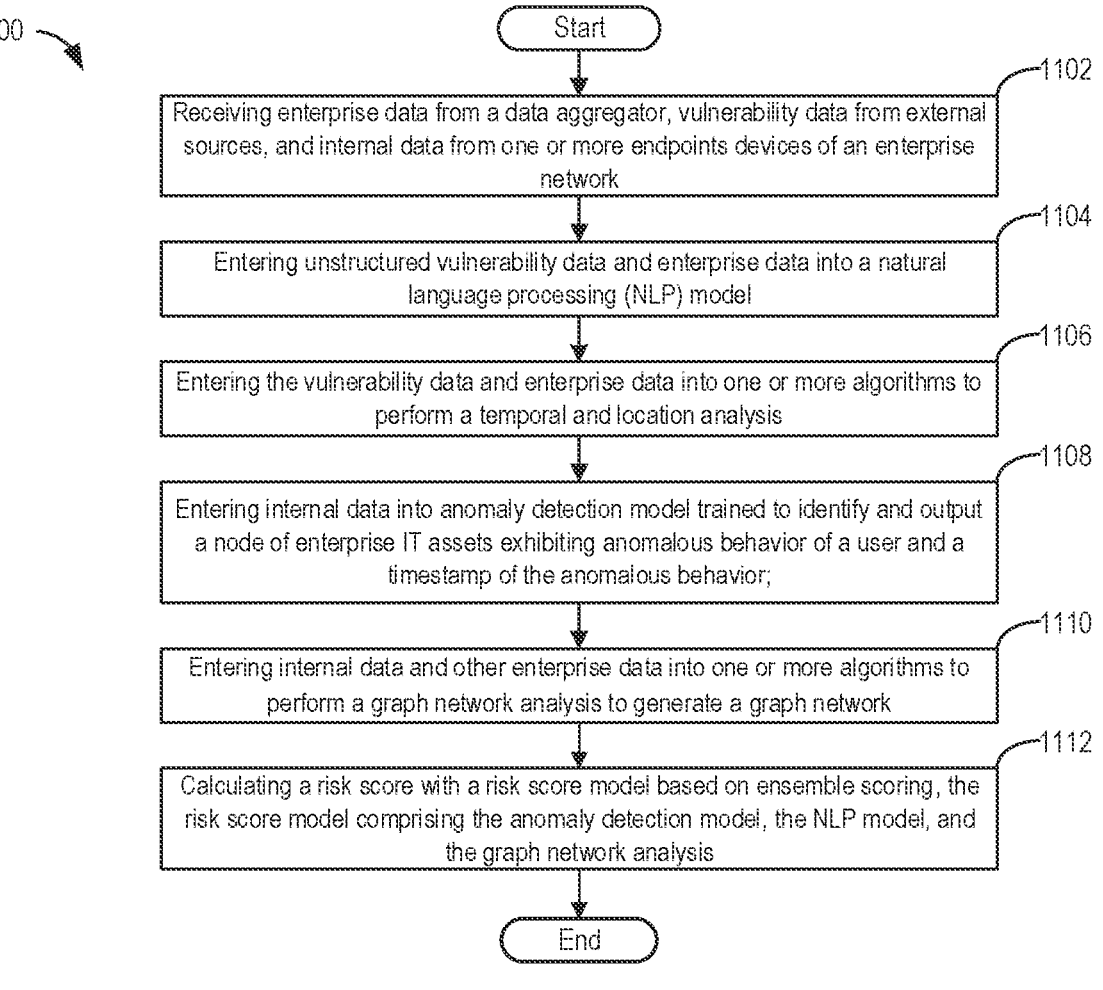
FIG. 11 shows an exemplary method for performing risk score calculation with a risk score model.
Figure 14:
FIG. 14 shows an example of a threat dashboard displayed on a display device.
Figure 15:
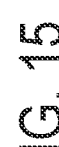
FIG. 15 shows an example of a graph network included in a threat dashboard.

Disclosed herein are various systems and methods for automating the process of identifying cybersecurity threats in an enterprise network and implementing remediation measures to address vulnerabilities in the enterprise network. An example of an enterprise network and system components is illustrated in FIG. 1. The enterprise network may be operatively coupled to a cybersecurity intelligence and asset management platform as illustrated in FIG. 2 to identify and solve cybersecurity threats. FIG. 3 illustrates an example of the cybersecurity intelligence and asset management platform. A process for processing data from various data sources in a cybersecurity intelligence and asset management system is shown in FIG. 4. FIGS. 5A and 5B illustrate example processes for training a risk score model and deploying the risk score model. An example of a process for training an NLP model to identify topics, phrases, and entities from threat text is shown in FIG. 6. An example of a process for training an anomaly detection model to detect anomalies, identify nodes wherein the detected anomalies originate, and output a timestamp for the detected anomalies is shown in FIG. 7. A process for generating a graph network is illustrated in FIG. 8. FIG. 9 illustrates a process for training the anomaly detection model and retraining the anomaly detection model based on detected anomalies. A method for implementing remediation measures with a cybersecurity intelligence and asset management system is shown in FIG. 10. A method for calculating a risk score with a risk score model is shown in FIG. 11. A method for implementing remediation measures from a threat remediation policy based on the calculated risk score is shown in FIG. 12. As shown in FIGS. 13A-13B, timelines are provided for addressing vulnerabilities according to global asset databases and malicious information gathered from unstructured data sources. FIG. 14 shows an example of a threat dashboard displayed on a display device that may be generated via the methods disclosed herein, and FIG. 15 shows an example of a graph network included in a threat dashboard.

FIG. 1 shows an example networked computing environment 100 of an enterprise wherein the cybersecurity intelligence and asset management platform may operate. The networked computing environment 100 may include a plurality of devices, such as a mobile information appliance 104, a laptop computer 106, and mobile information appliance 108, such as a smart phone. The plurality of devices described may utilize various operating systems including Microsoft Windows, Apple iOS, Apple Mac OS, Link Operating System, and the like. The plurality of devices may be considered a node in the enterprise network.

The plurality of devices may utilize the internet 102 to access resources 118 or an enterprise network 110. As one example, resources 118 may include web servers 120 and the like. Other examples of resources 118 may include a modem, a router, a printer, and the like wherein each example may be considered a node in the enterprise network. The enterprise network 110 may further comprise a plurality of servers including a file server 112, an email server 114, and a data base server 116, for example. The plurality of client devices may utilize the internet 102 to remotely access various files, emails, and/or data from the plurality of servers.

FIG. 2 illustrates a cybersecurity intelligence and asset management platform 200 operatively coupled to a user interface of a display device that performs a cybersecurity threat analysis and outputs results of the cybersecurity threat analysis and implements remediation measures in response to identified cybersecurity threats. The cybersecurity intelligence and asset management platform 200 can be deployed over a web hosting service or a cloud service.

The cybersecurity intelligence and asset management platform 200 and components include software agents, such as software agents 202a and software agents 202b, enterprise information technology (IT) assets 204, and a data aggregator 206. The software agents 202a may be communicatively coupled to the enterprise IT assets 204 to obtain information about the enterprise IT assets. In particular, the enterprise IT assets 204 may include software, hardware, I/O devices, and the like. As such, the software agents 202a gathers information regarding the latest version of the operating system, recent patch updates that have been downloaded and installed, and patch updates that have not been downloaded and installed as some examples. The information obtained by the software agents may be stored in the data aggregator 206.

Specifically, the data aggregator 206 obtains cybersecurity threat or vulnerability data gathered by the software agents 202a for user-provided network domains by connecting to the Internet. The data aggregator 206 may be a standard data bases, such as a NoSQL, that stores details of the various hardware and software. Some details may include patch details including the last update of a particular patch. The data aggregator 206 may be configured to update at various frequencies. For example, the data aggregator 206 may be updated hourly, daily, or weekly.

Once the data source is obtained, the data aggregator 206 parses the data and generates a first XML. While the data aggregator 206 is generating the first XML, the data aggregator filters out unwanted information from the page source. For example, the data aggregator 206 may collect metadata on relevant page elements that are input into other components of the cybersecurity intelligence and asset management platform 200. Once the first XML is generated by the data aggregator, a rules engine that applies selected cybersecurity threat intelligence guidelines receives the first XML as input and generates reports based on the cybersecurity threat intelligence guidelines.

The cybersecurity system and components may include a cybersecurity asset management tool 208 that receives input, such as the first XML, and various cybersecurity threats or vulnerability data from social media and media data sources 210, external data sources 212, and other data sources 214. The process of obtaining threat or vulnerability data from social media and media data sources 210 and other data sources 214 may be a semi-automated process whereas the process of obtaining data from external data sources 212 may be an automated process. The distinction between the semi-automated process and automated process is based on the reliability of the data source and whether false information regarding vulnerabilities and the corresponding remedies may be obtained from the data source. Since external data sources 212 are released by owners of software, the information obtained from the various sources is considered reliable.

Additionally, the frequency of obtaining data from external data sources 212 may vary according to the frequency of updates by the various global asset databases, such as NIST and CVE. The global data asset databases may update the downloadable files daily in some cases or monthly in other cases. The frequency of updates to the global data asset databases depends on the criticality of a vulnerability. The cybersecurity intelligence and asset management platform 200 is configured to update external sources according to user request, which may be hourly, daily, weekly, or monthly. The cybersecurity intelligence and asset management platform 200 has an established process of downloading the data in a particular format or schema, which is recognized by the software to enable an automation of obtaining data from the external data sources 212. In this way, manual intervention by the user during the downloading process may be decreased.

Unstructured data may be gathered from social media and media data sources 210 and other data sources 214. The unstructured data may include information regarding potential threats to hardware or software components of the enterprise IT assets 204. The aforementioned information may be obtained from social media and media data sources 210 like social media (e.g., Twitter), various global forums/blogs, and discussion groups, including hacker groups.

Some examples of external data sources 212 may include global asset databases, such as CVE, NVD, OEMS (e.g., Microsoft or Cisco), and other government data sources. The global asset databases may provide information regarding cybersecurity threats or vulnerabilities and potential remedies for the cybersecurity threats or vulnerabilities. The information regarding cybersecurity threats/vulnerabilities and potential remedies may be downloaded from data files, such as html, txt, csv, and XML files. The data files may include information, such as a timestamp, a heading, and long description of the threat.

For example, the Microsoft Corporation may alert a user of a vulnerability with a product. In particular, Windows 10.3.1 may be vulnerable to a particular problem and Microsoft Corporation may recommend installation of a patch to solve the problem via information from the database. In other examples, the vulnerabilities may be associated with other software utilized in electronic devices, such as laptops, desktops, and the like. In particular, Linux, Adobe, Bing, Zoom, and the like may be susceptible to vulnerabilities. The information included in the various databases may identify threats with the software described above and provide remedies for the threats. Other data sources 214 may include internal security logs, such as ArcSight or SIEM, IoT logs, and news sources as some examples.

The cybersecurity asset management tool 208 may further include the rules engine. The dynamic and adaptive rules engine is a core component of the cybersecurity intelligence and asset management platform 200. The rules engine may accept tagged XML document generated by a crawler component (e.g., additional or alternative software agents) and confirm various metadata elements with their attributes as per criteria selected by a user. The rules engine may be self-learning, having the ability to learn from cybersecurity threat data sources. In particular, the rules engine may be able to detect anomalies in user operation of an endpoint device within a node. Anomalies that do not correspond to a cybersecurity threat or vulnerability may be recognized by the rules engine as normal user behavior after a first occurrence of a respective anomaly.

The analysis rules engine may utilize input data, such as social media and media data sources 210 and other data sources 214, and a natural language processing (NLP) model 218 to extract topics, phrases, and entities from threat alert text (e.g., vulnerability data) and output results, such as output 228. As described above, the threat alert text may include topics, phrases, and entities from unstructured data regarding information about cybersecurity threats/vulnerabilities. In particular, some of the algorithms utilized to extract topics, phrases, and entities may include text mining algorithms, topic modeling algorithms, scoring algorithms, and named entity recognition (NER) algorithms. In particular, entities may be the names of places for a known vulnerability, such as a particular vulnerability found in a version of software running in the UK. As such, the UK may be a named entity. Further, topics may include a specific vulnerability located in a certain location. In addition, the algorithms may identify key threat elements for particular vulnerabilities.

Additionally, the analysis rules engine may utilize the input data in a temporal and location analysis 220 that outputs results, such as output 230, from a temporal and location analysis. As described above, the input data may include social media and media data sources 210, external data sources 212, and other data sources 214. The temporal and location analysis may analyze location data and time data for the vulnerability data in the threat text. As such, temporal and information for threats may be obtained, including when the last threat for a particular vulnerability was last reported or the global location of the vulnerability. In this way, the threat may be classified according to timestamps and location details.

The analysis rules engine may further include a graph network analysis 222 that outputs results such as graph network 232. The graph network analysis 222 analyzes key threat nodes related to software. As one example, a vulnerability in software such as an operating system may have the potential to infect software or hardware in a computing system. In particular, there may be a threat related to Windows 10.3.1 that may be associated with another software installed in a particular machine or another software installed in another machine. Some algorithms that may be used in the graph network analysis 222 may include degree centrality algorithms, betweenness centrality algorithms, and the like. The algorithms may generate a graph network 232 that demonstrates the connected entities in the enterprise and may be used to identify nodes within an enterprise network that have the potential to allow identified vulnerabilities to spread to other nodes within the enterprise network. For example, the graph network analysis 222 may consider the potential for an existing machine to be infected in addition to considering the potential for similar machines in the network to be infected.

The graph network 232 may be based on information stored and outputted from the data aggregator 206. As described above, the data aggregator 206 stores information regarding hardware, software, and the like in machines in the enterprise network. In particular, the data aggregator 206 may store information regarding machine identification (ID) for a plurality of machines (or end points) in the network and the software installed and downloaded on the plurality of machines in the network. The graph network analysis 222 identifies common factors (e.g., software installed and downloaded) between infected machines in the plurality of machines in the network that links and connects a subset of the plurality of machines in the network.

A link between the components in the network connects the components, defining a relationship between a particular component in the network and other components in the network, which enables the graph network 232 to be generated. The components may be other software on a particular machine or software on a different machine. The graph network 232 is multifunctional in that that it identifies components in the graph network 232 that are infected and components in the graph network 232 that may potentially be infected. The connection between components may be identified according to information gathered from the external data sources 212. For example, depending on the level of the threat, a particular version of Windows may include a software vulnerability that may potentially infect a specific version of Adobe on the same machine in the network.

A threat remediation policy and risk score calculation 224 may be performed from multiple data sources in the analysis rules engine. In particular, the threat remediation policy and risk score calculation 224 may be based on outputs, such as the model output 228, the analysis output 230, and the graph network 232. Based on these outputs, the threat remediation and risk score calculation 224 may identify which nodes in the network are particularly vulnerable based on a degree of connectivity to other software. In particular, vulnerabilities may be assigned a threat score ranging from 1-10. For each type of vulnerability, a node is assigned a CVE score associated with that vulnerability. When node scoring is combined with an algorithm that determines the devices that are connected to each other in the network, a risk score is calculated.

The threat remediation policy and risk score calculation 224 may be automated or semi-automated to determine patch recommendations based on information from the various data sources described herein that may remedy threats and vulnerabilities in the network. In particular, the threat remediation policy and risk score calculation 224 determined based on external data sources 212 may be an automated process due to the increased reliability of the information. In contrast, the threat remediation policy and risk score calculation 224 may be determined based on social media and media data sources 210 and other data sources 214 may be a semi-automated process due to the increased potential of obtaining malicious information from these sources. As such, a risk score calculated based on the social media and media data sources 210 and other data sources 214 may be allocated differently than the automated process. In this way, the risk score may be assigned based on user interventions wherein a user assesses the analysis performed by the threat remediation policy and risk score calculation 224 and triggers the patch update process.

The patch recommendations may be sent as input to another data base, such as threat remediation policy data 216, and implemented by software agents 202b to remedy vulnerabilities in the enterprise IT assets 204. The remediation measures are implemented according to the criticality of the score determined by the threat remediation police and risk score calculation 224.

The cybersecurity asset management tool 208 may include a reporting engine wherein a reports service is a core component. The reporting engine accepts XML document generated by the rules engine component. Scan results are shown to the user in the form of reports generated by a reporting component of the reporting engine. Two types of reports may be generated, such as a summary report and a page-wise detailed report. By generating two reports, the reports may be analyzed in various ways. The reporting engine may output the results to a threat dashboard 226 (e.g., a user interface of a display device).

The threat dashboard 226 may include a user interface layer that displays the cybersecurity threat intelligence data, graphs, charts, and the like. The user interface is a basic component of the cybersecurity intelligence and asset management platform which interacts with the user. The user interface may collect data entered by user, validate the data, and send the data to other components in the cybersecurity threat system for processing. Once the processing is completed successfully, reports are generated and displayed on a display device.

Referring to FIG. 3, cybersecurity intelligence and asset management system 302 of a cybersecurity intelligence and asset management platform 300 configured to receive enterprise data from enterprise IT assets and vulnerability data from external sources is shown. In some embodiments, cybersecurity intelligence and asset management system 302 may be implemented in the cybersecurity intelligence and asset management platform 200 of FIG. 2. In some embodiments, at least a portion of cybersecurity intelligence and asset management system 302 is disposed at a device (e.g., edge device, server, etc.) communicably coupled to enterprise IT assets via wired and/or wireless connections. Cybersecurity intelligence and asset management system 302 may be operably/communicatively coupled to a user input device 332 and a display device 334 of enterprise IT assets. In other embodiments, cybersecurity intelligence and asset management system 302 may be operably/communicatively coupled to a user input device 332 and display device 334 of a computing device not included in the enterprise IT assets.

Cybersecurity intelligence and asset management system 302 includes a processor 304 configured to execute machine readable instructions stored in non-transitory memory 306. Processor 304 may be single core or multi-core, and the programs executed thereon may be configured for parallel or distributed processing. In some embodiments, processor 304 may optionally include individual components that are distributed throughout two or more devices, which may be remotely located and/or configured for coordinated processing. In some embodiments, one or more aspects of processor 304 may be virtualized and executed by remotely-accessible networked computing devices configured in a cloud computing configuration.

Non-transitory memory 306 may store an analysis rules engine module 308, a training module 320, an inference module 322, a communication module 324, a web crawler module 326, a data aggregator module 328, and a threat/vulnerability database 336. Analysis rules engine module 308 may be configured to identify cybersecurity threats and implement remediation measures in response to identified cybersecurity threats. In particular, analysis rules engine module 308 may comprise an NLP module 310, a temporal and location analysis module 312, a graph network analysis module 314, an anomaly detection module 316, and a threat remediation policy module 318. In some examples, NLP module 310 may include one or more machine learning (ML) models configured to identify topics, phrases, and entities in threat text/vulnerability data and may include trained and/or untrained ML models, and may further include various data, or metadata pertaining to the one or more ML models stored therein. As an example, topics, phrases, and entities in threat text/vulnerability data may be identified by training an NLP model to topics, phrase, and entities in threat/vulnerability data by inputting threat text/vulnerability data annotated with pre-determined topics, phrases, and entities included in the threat text/vulnerability data.

The temporal and location analysis module 312 may include one or more algorithms for analyzing time data and location data of unstructured vulnerability. The analysis may output a timestamp for each pre-determined vulnerability and/or the global location of each pre-determined vulnerability. The graph network analysis module 314 may include one or more algorithms that generate a graph network that visually indicates a connectivity between a particular vulnerability and one or more nodes of the enterprise IT assets. In some embodiments, the one or more algorithms may be degree centrality algorithms and betweenness centrality algorithms.

Anomaly detection module 316 may include one or more anomaly detection models, which may be ML models (e.g., variational autoencoders), which may be configured detect anomalous behavior from a user operating enterprise IT assets. Each anomaly detection model is trained to identify anomalies in user behavior based on deviations from normal user behavior. Anomaly detection module 316 may include trained and/or untrained ML models, and may further include various data, or metadata pertaining to the one or more ML models stored therein.

Additionally, non-transitory memory 306 may store a threat remediation policy module 318 that stores instructions for performing a risk score calculation based on outputs from other modules in the analysis rules engine module 308 and implementing remediation measures based on the outputs from the other modules in the analysis rules engine module. In particular, the risk score calculation may be determined with ensemble scoring based on outputs from the NLP model, the anomaly detection model, and the graph network analysis. In some examples, 310 may include one or more machine learning (ML) models configured to perform a risk score calculation based on outputs from the NLP model, the anomaly detection model, and the graph network analysis.

Non-transitory memory 306 may further store a training module 320, which may comprise instructions for training one or more of the ML models stored in analysis rules engine module 308. Training module 320 may include instructions that, when executed by processor 304, cause cybersecurity intelligence and asset management system 302 to conduct one or more of the steps of a training method for training the NLP model to identify topics, phrases, entities in threat/vulnerability data, a training method for training the anomaly detection model to identify deviations in user behavior while operating the enterprise IT assets, and a training method for the risk score model. In some embodiments, training module 320 may include instructions for implementing one or more gradient descent algorithms, applying one or more loss functions, and/or training routines, for use in adjusting parameters of one or more ML models of analysis rules engine module 308. Training module 320 may include training datasets for the one or more ML models of analysis rules engine module 308.

Non-transitory memory 306 also stores an inference module 322 that comprises instructions for testing new data with the trained NLP model, the trained anomaly detection model, and the trained risk score model. After the NLP model, the anomaly detection model, and the risk score model have been trained, the trained models may be used by the cybersecurity intelligence and asset management system to implement remediation measures in response to cyberattacks on enterprise IT assets. Non-transitory memory 306 also stores the communication module 324. The communication module 324 may facilitate transmission of electronic data (e.g., data collected by web crawlers, data collected by software agents, etc.) to the cybersecurity intelligence and asset management system 302.

Communication via the communication module 324 can be implemented using one or more protocols. The communication module can be a wired interface (e.g., a data bus, a Universal Serial Bus (USB) connection, etc.) and/or a wireless interface (e.g., radio frequency, infrared, near field communication (NFC), etc.). For example, the communication module may communicate via wired local area network (LAN), wireless LAN, wide area network (WAN), etc. using any past, present, or future communication protocol (e.g., BLUETOOTH™, USB 2.0, USB 3.0, etc.).

Non-transitory memory 306 also stores a web crawler module 326 that comprises instructions for collecting threat text and vulnerability data from external sources, such as government sources, social media, and original equipment manufacturers (OEMs) and generates an XML file based on the threat text and vulnerability data. Additionally, non-transitory memory 306 stores a data aggregator module 328 that comprises instructions for software agents that collects enterprise data 330 pertaining to the operating system and other various software on a plurality of machines of the enterprise IT assets and comprises instructions for software agents to implement remediation measures based on the threat remediation policy. In one example, the instructions may enable the software agents to identify the most recent patch updates and determining if the updates have been downloaded and installed on the plurality of machines. In response to determining that updates have not been downloaded and installed, the software agent may download and install the updates.

Non-transitory memory 306 further stores threat/vulnerability database 336. Threat/vulnerability database 336 may include, for example, data collected by web crawlers from various sources, including social media, external sources, and the like. Threat/vulnerability database 336 may further include one or more training datasets for training the one or more ML models of NLP module 310.

In some embodiments, non-transitory memory 306 may include components disposed at two or more devices, which may be remotely located and/or configured for coordinated processing. In some embodiments, one or more aspects of non-transitory memory 306 may include remotely-accessible networked storage devices configured in a cloud computing configuration.

User input device 332 may comprise one or more of a touchscreen, a keyboard, a mouse, a trackpad, a motion sensing camera, or other device configured to enable a user to interact with and manipulate data within cybersecurity intelligence and asset management system 302. In one example, user input device 332 may enable a user to make a selection of threat/vulnerability data to use in training a machine learning model, or for further processing using a trained machine learning model (e.g., the NLP model and anomaly detection model disclosed herein).

Display device 334 may include one or more display devices utilizing virtually any type of technology. In some embodiments, display device 334 may comprise a computer monitor, and may display output from the threat remediation policy module 318, including a graph network, identified anomalies in particular nodes, and the like. Display device 334 may be combined with processor 304, non-transitory memory 306, and/or user input device 332 in a shared enclosure, or may be peripheral display devices and may comprise a monitor, touchscreen, projector, or other display device known in the art, which may enable a user to view output from the threat remediation policy module 318, and/or interact with various data stored in non-transitory memory 306.

It should be understood that cybersecurity intelligence and asset management system 302 shown in FIG. 3 is for illustration, not for limitation. Another appropriate cybersecurity intelligence and asset management system may include more, fewer, or different components.

Turning to FIG. 4, a block diagram of a process 400 for processing data from various sources with a cybersecurity intelligence and asset management system. The cybersecurity intelligence and asset management system may be an embodiment of the cybersecurity intelligence and asset management system 302 of FIG. 3. The process 400 may include receiving internal data 402, enterprise data 404 stored in a data aggregator, which may be an embodiment of the data aggregator 206, and external data 406. Internal data 402 may be collected from event logs generated by end point device of the enterprise IT assets 424. External data 406 may be collected from external data sources described above with regards to FIG. 2. Enterprise data 404 may include gathering the most version of the operating system, recent patch updates that have been downloaded and installed, and patch updates that have not been downloaded and installed as some examples.

The process 400 includes entering internal data 402 and enterprise data 404 from a data aggregator communicatively coupled to the enterprise IT assets 424 into an anomaly detection model to identify a node and a timestamp for the node wherein user operation at an end device within the node deviates from normal user operation. For example, an enterprise IT asset such as a Web server is configured to handle a certain amount of traffic, and it operates within expected parameters and performance metrics, such as response time, CPU utilization, memory usage, and network traffic. As long as the server is responding to requests, maintaining acceptable response times, and showing normal resource usage, it is considered to be in normal operation. In an abnormal operation scenario, if the server is compromised, it could lead to unauthorized access, data breaches, or malware infection and the abnormal operation scenario may threaten data integrity and user privacy. Abnormal operation may result in disruptions or degraded performance, such as downtime due to hardware failures, software crashes, or network outages. In some embodiments, any deviation from normal user operation of the end device may be flagged by the anomaly detection model. The process 400 also includes entering internal data 402 and enterprise data 404 into one or more algorithms that perform a graph network analysis 410 to generate a graph. The generated network graph may visually indicate the connectivity between different nodes of the enterprise IT assets 424.

Since the nodes of the enterprise IT assets 424 may be communicatively coupled to one another, nodes with a higher degree of connectivity may be more vulnerable to cyberattacks than nodes with a lower degree of connectivity. As such, nodes with the higher degree of connectivity may be prone to increased infection rates between the notes during a cyberattack of enterprise IT assets 424. Each node may be assigned a CVE score based on the degree of connectivity and a degree of vulnerability of the respective node. In this way, the graph network generated from the graph network analysis 410 may enable nodes with higher degrees of connectivity to be identified, and in response to a critical vulnerability, other nodes communicatively coupled to an infected node or potentially infected node with may be isolated from an infected node or potentially infected node.

The process 400 includes entering enterprise data 404 and external data 406 into a natural language processing (NLP) model 412 to identify and extract topics, phrases, and entities included in unstructured threat text of the enterprise data and the external data with a certain degree of confidence (e.g., a probability that the identified topics, phrases, and entities are associated with a vulnerability of the enterprise IT assets 424). The process 400 further includes entering enterprise data 404 and external data 406 to a temporal and location analysis 414 to identify a time stamp of identified threat text and an original location of the identified threat text. In this way, unstructured data is transformed into a new data format including a degree of confidence that can be used to generate more structured output data, such as the risk score calculation discussed further below, the output in the format of risk scores that can be compared to threshold calibrated for particular systems.

A risk score calculation 416 may be performed based on output from the anomaly detection model 408, the graph network analysis 410, the NLP model 412, and the temporal and location analysis 414. Based on the risk score determined when performing the risk score calculation 416, remediation measures may be implemented automatically or semi-automatically according to a threat remediation policy 418. The threat remediation policy 418 includes pre-determined remediation measures that may be implemented in response to a particular risk score. The remediation measures may be stored in a threat remediation policy database 422 that may be accessed by software agents that are configured to implement the remediation measures. Further, the threat remediation policy 418 may output results of the cybersecurity threat analysis to a threat dashboard (e.g., a user interface) of a display device 420, enabling a user to view the results. In some embodiments, the results may alert a user that remediation measures are implemented automatically and or alert the user that remediation measures may be implemented in response to user intervention. FIGS. 13A-13C illustrate different remediation measures depending on the reliability of the data sources.

FIG. 5A shows a process 500 for training a risk score model. The process 500 includes receiving enterprise data 502 from a data aggregator, which may be an embodiment of the data aggregator of FIG. 1, and threat remediation policy data 504 from a database. In this way, internal data and external data comprising user logs, system logs, text, and network nodes may be obtained and used to train the risk score model. The process 500 includes performing data pre-processing 506 on the enterprise data 502 and the threat remediation policy data 504. Data pre-processing 506 may include annotating, ingesting, and pre-processing the enterprise data 502 and threat remediation policy data 504.

More specifically, the enterprise data 502 and the threat remediation policy data 504 may be aggregated to determine the volume of each type of incident included in the data over a rolling window and outliers and infrequent incident records in the enterprise data 502 and the threat remediation policy data 504 may be identified. Additionally, a sanity check may be performed on time series data included in the enterprise data and threat remediation policy data. Further, equidistant reference periods may be identified in the enterprise data and threat remediation data and missing values in the enterprise data and threat remediation policy data may be treated. Data pre-processing 506 may also include augmenting minority classes included in the enterprise data and threat remediation policy data with text augmentation.

The process 500 for training the risk score model may further include feature engineering 508. Feature engineering 508 may include identifying log data of the enterprise data 502 with warnings and errors in addition to performing sentence segmentation and tokenization on text data included in the enterprise data. The enterprise data 502 and threat remediation policy data 504 may also be vectorized and a principle component analysis (PCA) may be performed on the enterprise data and threat remediation policy data to reduce the dimensionality of the data. Feature engineering 508 may also include calculating a degree of centrality and betweenness centrality on the enterprise data 502 for a graph network analysis. Additionally, feature engineering 508 may include learning normal user behavior with a variational autoencoder according to a semi-supervised approach. Data pertaining to the feature engineering 508 may be stored in a feature store database 510.

The process 500 may include training an initial risk score model 512. The initial risk score model may include an initial anomaly detection model, an initial natural language processing (NLP) model, and the one or more algorithms of the initial graph network analysis (e.g., degree centrality algorithms and betweenness centrality algorithms), which may be stored in a model registry database 516. Example processes for training the initial NLP and the initial anomaly detection model are shown below in FIGS. 7 and 8, respectively. The process 500 may also include performing a risk score calculation 514 wherein a first training risk score is determined for the initial anomaly detection model, a second training risk score is determined for the initial NLP model, and a third training risk score is determined for the initial graph network analysis.

The process 500 may include performing a risk score evaluation 518 on the first training risk score, the second training risk score, and the third training risk score to assess the performance of the initial risk score model 512. Based on a quality of the performance initial risk score model 512, a risk score optimization 520 may be performed to adjust the initial risk score model, which may increase the quality of the performance of the initial risk score model. The process 500 may continue until the initial risk score model is sufficiently trained for deployment in an inference module, which may be an embodiment of the inference module 322 of FIG. 3.

Turning to FIG. 5B, a process 501 for deploying a trained risk score model is shown. The process 501 may include receiving enterprise data 502 from a data aggregator, which may be an embodiment of the data aggregator discussed in FIG. 1. The process 501 may include entering the enterprise data 502 into the risk score model 522. Similar to the initial risk score model 522, the risk score model comprises a partially trained or trained anomaly detection model, a trained natural language processing (NLP) model, and a graph network analysis. The process 501 may include using input from the risk score model 522 to perform a risk score calculation 524. A first risk score for the trained anomaly detection model, a second risk score for the trained NLP model, and a third risk score for the graph network analysis may be determined during the risk score calculation 524.

The process 501 may also include implementing threat remediation 526 in response to the first risk score, the second risk score, and the third risk score. Different threat remediation measures may be implemented in response to each of the first risk score, the second risk score, and the third risk score exceeding a first threshold, a second threshold, and a third threshold, respectively. The process 501 may further include post-processing 528 of the risk score model 522. In particular, the post-processing 528 may include monitoring the risk score model, identifying local explanations for the calculated risk scores for each of the partially trained or trained anomaly detection model, the trained NLP model, and the graph network analysis, and performance monitoring of key performance metrics, such as response time, CPU utilization, memory usage, and network traffic. Data pertaining to post-processing 528 and the risk score model may be stored in an audit trail database 530.

Turning to FIG. 6, a process 600 for training a natural language processing (NLP) model 618 (e.g., the NLP model 412) with a supervised ML approach is illustrated. The NLP model 618 may be trained to identify topics, phrases, and entities included in vulnerability data (e.g., threat text) obtained from external sources via web crawlers, in accordance with one or more operations described in greater detail below. The process 600 may be implemented by one or more computing systems, such as the cybersecurity intelligence and asset management system 302 of FIG. 3, to train NLP model 618 to identify topics, phrases, and entities included in unstructured vulnerability data. Once trained, the NLP model 618 may be used to identify topics, phrases, and entities of vulnerability data obtained with a web crawler communicatively coupled to the cybersecurity intelligence an asset management system in accordance with one or more operations described in greater detail below.

The process 600 includes obtaining enterprise data from a data aggregator 602 and external data from data sources 604, such as external sources described herein with respect to FIG. 1. The external data may be unstructured vulnerability data obtained from the external sources. In one example, the unstructured vulnerability data may be obtained from blogs. In another example, the unstructured vulnerability data may be obtained from external security data sources, such as the CVE.

The process 600 includes entering the enterprise data and the unstructured vulnerability data into a data pre-processor 606 wherein the unstructured vulnerability data may be annotated. Each respective annotation of a string of unstructured vulnerability data may include a ground truth topic, a ground truth phrase, or a ground truth entity.

The process 600 includes generating a plurality of training sets of unstructured vulnerability data using a dataset generator 608. The plurality of training sets of unstructured vulnerability data may be stored in a training module 610. The training module 610 may be the same as or similar to the training module 320 of cybersecurity intelligence and asset management platform 300 of FIG. 3. The plurality of training sets of unstructured vulnerability data may be divided into training sets 612 and test sets 614. Each of training sets 612 and test sets 614 may include strings of unstructured vulnerability data and ground truth annotations of the strings of unstructured vulnerability data, the ground truth annotations comprising the ground truth topic, the ground truth phrase, or the ground truth entity.

Once each set is generated, each set may be assigned to either the training sets 612 or the test sets 614. In an embodiment, the set may be assigned to either the training sets 612 or the test sets 614 randomly in a pre-established proportion. For example, the set may be assigned to either the training sets 612 or the test sets 614 randomly such that 90% of the sets generated are assigned to the training sets 612, and 10% of the image generated are assigned to the test sets 614. Alternatively, the set may be assigned to either the training sets 612 or the test sets 614 randomly such that 85% of the sets generated are assigned to the training sets 612, and 15% of the sets generated are assigned to the test sets 614. It should be appreciated that the examples provided herein are for illustrative purposes, and sets may be assigned to the training sets 612 dataset or the test sets 614 dataset via a different procedure and/or in a different proportion without departing from the scope of this disclosure.

A number of training sets 612 and test sets 614 may be selected to ensure that sufficient training data is available to prevent overfitting, whereby an initial NLP model 616 learns to map features specific to samples of the training set that are not present in the test set. The process 600 includes training the initial NLP model 616 on the training sets 612. The initial NLP model 616 may be an Xgboost model. The Xgboost model may include one or more algorithms to extract topics, phrases, and entities of vulnerability data (e.g., threat text), the one or more algorithms including text mining algorithms, topic modeling algorithms, scoring algorithms, and named entity recognition (NER) algorithms. The ground truth annotations may be compared with identified topics, phrases, and entities output from the initial NLP model 616 to calculate a loss function that is used to adjust model parameters of the initial NLP model.

Once NLP model is sufficiently trained, the NLP model may be stored in the NLP module 310 of FIG. 3 and the inference module 322 of FIG. 3. The NLP model 618, when deployed, may identify and extract topics, phrases, and entities of vulnerability data (e.g., threat text) and output a metric, such as precisions, recall, F1-score, or area under the ROC curve. The outputted metric may be a risk score. Newly-acquired vulnerability data may be entered as input to the NLP 618 to output extracted topics, phrases, and entities 620.

A process 700 for training an anomaly detection model 722 (e.g., the anomaly detection model 408) is illustrated. The anomaly detection model 722 may be trained to identify anomalous behavior in one or more nodes of the user operating enterprise IT assets, such as enterprise IT assets 204 of FIG. 2, in accordance with one or more operations described in greater detail below. In one or more embodiments, the anomaly detection model 722 may be a variational autoencoder. Analogous behavior of the user may include behavior of the user that results in operation of a node (in the enterprise IT assets) that deviates from a normal operation of the node. The process 700 may be implemented by one or more computing systems, such as cybersecurity intelligence and asset management system 302 of FIG. 3, to train the anomaly detection model 722 to identify anomalous behavior of the use operating enterprise IT assets. Once trained, the anomaly detection model 722 may be used to identify and flag anomalous behavior by outputting the node wherein the anomalous behavior originates and a timestamp of the anomalous behavior, in accordance with one or more operations described in greater detail below.

The process 700 includes obtaining enterprise data from a data aggregator 702 and internal data from data sources 704, such as internal sources described herein with respect to FIG. 4. The internal data may be user data received from user logs obtained from the internal sources. In an example, the user data may include login activities, web usage, application usage, and the like. The process 700 includes entering the internal data and the enterprise data into a data pre-processor 706 wherein the internal data and the enterprise data may undergo unsupervised data pre-processing.

The process 700 includes generating a plurality of training sets of data using a dataset generator 708. The plurality of training sets of data may be stored in a training module 710. The training module 710 may be the same as or similar to the training module 320 of cybersecurity intelligence and asset management platform 300 of FIG. 3. The plurality of training sets of data may be divided into training sets 712 and test sets 714. Training sets 712 may be sorted into a set of normal internal data and a set of anomalous internal data.

Additionally, a number of training sets 712 may be assigned to a validation set, to ensure that sufficient training data is available to prevent overfitting, whereby the anomaly detection model learns to map features specific to samples of the training set that are not present in the test set. In particular, the validation set may include the set of anomalous internal data. In this way, the anomaly detection model may be trained to detect anomalous behavior of the user.

Once each set is generated, each set may be assigned to either the training sets 712 or the test sets 714. In an embodiment, the set may be assigned to either the training sets 712 or the test sets 714 randomly in a pre-established proportion. For example, the set may be assigned to either the training sets 712 or the test sets 714 randomly such that 90% of the sets generated are assigned to the training sets 712, and 10% of the image generated are assigned to the test sets 714. Alternatively, the set may be assigned to either the training sets 712 or the test sets 714 randomly such that 85% of the sets generated are assigned to the training sets 712, and 15% of the sets generated are assigned to the test sets 714. It should be appreciated that the examples provided herein are for illustrative purposes, and sets may be assigned to the training sets 712 dataset or the test sets 714 dataset via a different procedure and/or in a different proportion without departing from the scope of this disclosure.

A number of training sets 712 and test sets 714 may be selected to ensure that sufficient training data is available to prevent overfitting, whereby an initial anomaly detection model 716 learns to map features specific to samples of the training set that are not present in the test set. The process 700 includes training the initial anomaly detection model 716 on the training sets 712. The process 700 may include a validator 718 that validates the performance of the initial anomaly detection model 716 (as the initial anomaly detection model is trained) against the test sets 714. The validator 718 may take as input a trained or partially trained anomaly detection model (e.g., the initial anomaly detection model 716, but after training and update of the anomaly detection model has occurred) and a dataset of test sets 714, and may output an assessment of the performance of the trained or partially trained anomaly detection model on the dataset of test sets 714.

In one or more embodiments, the initial anomaly detection model is partially trained during the process 700 due to a small set of available training data. Accordingly, the initial anomaly detection model is trained during deployment of the anomaly detection model. In particular, the initial anomaly detection model is trained during deployment of the risk score model to identify the node and the timestamp associated with anomalous behavior of the user. As such, until the initial anomaly detection model is fully trained, each occurrence of anomalous behavior of the user may be flagged as an anomaly regardless of whether anomaly is indicative of a vulnerability to enterprise IT assets. A variational autoencoder reconstruction loss may be used to adjust model parameters of the initial anomaly detection model.

Once the anomaly detection model is sufficiently trained, the anomaly detection model may be stored in the anomaly detection module 316 or the inference module 720, which may be an embodiment of inference module 322 of FIG. 3. The anomaly detection model 722, when deployed, may detect anomalous behavior of the user and may output a probability, the probability indicating that a potential anomaly is within a pre-determined confidence level. The probability may be a risk score. Newly-acquired images may be entered as input to the anomaly detection model 722 to output detected anomalies 724.

A process 800 for generating a graph network 812 from a graph network analysis (e.g., the graph network analysis 410) is illustrated. The graph network 812 that visually indicates a connectivity between a particular vulnerability and the one or more nodes of the enterprise IT assets, such as enterprise IT assets 204 of FIG. 2, in accordance with one or more operations described in greater detail below. The process 800 may be implemented by one or more computing systems, such as cybersecurity intelligence and asset management system 302 of FIG. 3, to perform a graph network analysis with one or more algorithms to generate the graph network 812. Once generated, graph network 812 may be used to identify one or more nodes with a high degree of connectivity with other nodes and generate a CVE score for each node based on the connectivity of the respective node.

The process 800 includes obtaining enterprise data from a data aggregator 802 and external data from data sources 804, such as external sources described herein with respect to FIG. 1. The external data may be vulnerability data obtained from the external sources. In one example, the unstructured vulnerability data may be obtained from external security data sources, such as the CVE. The process 800 includes entering the external data and the enterprise data into a data pre-processor 806 wherein the external data and the enterprise data may undergo unsupervised data pre-processing.

The graph network 812 may be generated by centrality algorithms 810 stored in an inference module 808, which may be an embodiment of the inference module 322 of FIG. 3. The graph network analysis may output a CVE score for each node in the graph network 812. The CVE score may indicate the criticality of a vulnerability based on the degree of connectivity of the respective node in relation to other nodes in the graph network 812. The CVE score for each node may be a risk score.

FIG. 9 shows a process 900 for training and retraining an anomaly detection model in a cloud environment 918. The process 900 includes receiving internal data 902 from one or more endpoint devices 920 in one or more nodes of enterprise IT assets, which may be an embodiment of the enterprise IT assets 204 of FIG. 2. The internal data 902 may include data corresponding to application usage 904, protocol usage 906, login activities 908, OS updates 910, web usage 912, application updates 914, and ports usage 916. The process 900 includes storing internal data 902 in an events log inventory database 922, which may be used as data to train and retrain the anomaly detection model.

The process 900 includes pre-processing the internal data 902 stored in the events log inventory database 922 with a data pre-processor 924 in a similar unsupervised manner described in FIG. 7. Once processed, the process 900 may include entering the internal data 902 as input to the anomaly detection model during model training 926. The model training 926 may be performed according to the process 700 described in FIG. 7. Once trained, the process 900 includes deploying the anomaly detection model as part of model inference 928. The process 900 may include implementing remediation measures according to a threat remediation policy at the one or more endpoint devices 920 in response to post-processing of the anomaly detection model by a post-processor 930. In response to the anomaly detection model identifying anomalous behavior of the user that deviates from normal behavior of the user at the one or more endpoint devices 920, the process 900 includes performing a key performance indicators (KPI) analysis 932 to evaluate the performance of the anomaly detection model. The process 900 may include performing a model re-training analysis 934 on the anomaly detection model to determine whether the anomaly detection model may undergo additional model training 926 to ensure that the detected anomaly is recognized as normal behavior of the user instead of an anomaly.

FIG. 10 is a flowchart illustrating a method 1000 for implementing remediation measures with a cybersecurity intelligence and asset management system, which may be an embodiment of the cybersecurity intelligence and asset management system 302 of FIG. 3. Method 1000 may be implemented with a computing device communicatively coupled to the cybersecurity intelligence and asset management system. Method 1000 may be carried out according to instructions stored in non-transitory memory and executed by one or more processors of the computing device.

At 1002, the method 1000 includes obtaining a first XML file from a data aggregator communicatively coupled to enterprise IT assets. The data aggregator may be an embodiment of the data aggregator 206 and the enterprise IT assets may be an embodiment of the enterprise IT assets 204 of FIG. 2. The first XML file may be collected by a software agent and sent to the data aggregator. The first XML file may include parsed enterprise data wherein the enterprise data includes data pertaining to software, hardware, and I/O devices of the one or more nodes of the enterprise network. In some embodiments, the first XML file may also include internal data from internal sources. The internal sources may be one or more endpoint devices included in one or more nodes of the enterprise network. As one example, the internal data may include application usage, protocol usage, login activities, operating system (OS) updates, web usage, application updates, and port usage. In this way, the cybersecurity intelligence and asset management system may access data regarding a current state of cybersecurity of the enterprise IT assets.

At 1004, the method 1000 includes obtaining a second XML file from a web crawler. The web crawler may include instructions stored in the web crawler module of 326 of FIG. 3. When executed, the instructions may cause a processor (e.g., processor 304) to collect threat text and vulnerability data from external sources, such as government sources, social media, and original equipment manufacturers (OEMs) and generate the second XML file based on the threat text and vulnerability data. The second XML file may include parsed vulnerability data. The vulnerability data may include both structured and unstructured data related to cybersecurity threats. In this way, the cybersecurity intelligence and asset management may access data regarding current vulnerabilities to the enterprise IT assets.

At 1006, the method 1000 includes entering the second XML to a natural language processing (NLP) model trained to extract topics, phrases, and entities. The NLP model may be trained according to the process described above with respect to FIG. 6. In particular, the NLP model may use an Xgboost model that relies on one or more algorithms, such as text mining algorithms, topic modeling algorithms, scoring algorithms, and named entity recognition (NER) to extract topics, phrases, and entities of unstructured vulnerability data included in the second XML file. In particular, vulnerability data included in the second XML file may include threat text associated with a particular cybersecurity threat. For example, a vulnerability data may be collected from unstructured data collected from a blog. The unstructured data may include phrases associated with a particular vulnerability associated with software downloaded on various enterprise IT assets. The NLP model may extract the phrases associated with the particular vulnerability. In this way, the cybersecurity intelligence and asset management system may determine potential vulnerabilities from unstructured vulnerability data, and accordingly, may implement remediation measures to address potential vulnerabilities described in unstructured vulnerability data.

At 1008, the method 1000 includes performing a temporal and location analysis based on the second XML file. As described herein, the temporal and location analysis may include analyzing time data and location data of unstructured vulnerability data included in the second XML file and outputting a third XML file comprising a most recent timestamp for each identified vulnerability and/or the global location of each identified vulnerability, respectively. Time data and location data may be analyzed with one or more algorithms.

At 1010, the method 1000 includes identifying an anomaly by inputting the second XML file into an anomaly detection model. The anomaly detection model may be trained according to the process described above with respect to FIG. 7. The anomaly detection model relies on internal data from one or more endpoint devices of the one or more nodes to identify anomalous behavior of the user. In particular, the NLP model may use a variational autoencoder that is trained on the internal data from the one or more endpoint devices to detect abnormal behavior of a user on an endpoint device.

At 1012, the method 1000 includes performing a graph network analysis of one more nodes based on the first XML file to generate a network graph. The graph network analysis of the one or more nodes may be performed according to the process described above with respect to FIG. 8. In some embodiments, performing the graph network analysis includes entering the first XML file as input to one or more algorithms and outputting the graph network. The graph network visually indicates a connectivity between a particular vulnerability and the one or more nodes of the enterprise network. An example graph network is shown in FIG. 15. By inputting the first XML file, which includes enterprise data, into the one or more algorithms, the algorithms may determine relationships or connectivity between nodes based on the software, hardware, I/O devices, and the like included in the one or more nodes. In this way, the graph network may indicate a degree of connectivity one node has with other nodes in the enterprise network. By determining the degree of connectivity of each node within the enterprise network, the vulnerability of each node to different types of cyberattacks may be determined.

At 1014, the method 1000 includes performing a risk score calculation based on ensemble scoring of outputs from the NLP model, the anomaly detection model, and the graph network analysis. The risk score calculation may include determining a first risk score for the anomaly detection model, a second risk score for the NLP model, and a third risk score for the graph network analysis. Both of the anomaly detection model and the NLP model may be trained to determine and output the first risk score and the second risk score based on data entered into the respective models. Further, the instructions for the graph network analysis may include code designated for determining and outputting the third risk score.

At 1016, the method 1000 includes determining a threat remediation policy based on each of the first risk score, the second risk score, and the third risk score. The threat remediation policy may implement certain remediation measures in response to the first risk score exceeding a pre-determined threshold value for the first risk score, the second risk score exceeding a pre-determined threshold value for the second risk score, and the third risk score exceeding the pre-determined threshold value for the third risk score. In some embodiments, the remediation measures may be different for each of the first risk score, the second risk score, and the third risk score. In other words, a first set of remediation measures may be implemented based on the first risk score, a second set of remediation measures may be implemented based on the second risk score, and a third set of remediation measures may be implemented based on the third risk score. The different remediation measures are described below in FIG. 12.

At 1018, the method 1000 includes displaying results on a display device and implementing threat remediation measures based on the threat remediation policy. The results may be displayed on a threat dashboard, which may be a user interface of the display device, which may be an embodiment of display device 334 of FIG. 3. The threat dashboard may be an embodiment of the threat dashboard 226 of FIG.

2. In some embodiments, the threat dashboard may display a summary of a cybersecurity analysis of the cybersecurity intelligence and asset management system. In particular, the threat dashboard may display the graph network, output from the anomaly detection model, vulnerability statistics, and the like. The cybersecurity intelligence and asset management system may also generate reports in pdf format as well as HTML format. A detailed report provides the cybersecurity threat analysis metrics of all the sources and summary report lists a high level summary of the cybersecurity threat across all sources. An example of the threat dashboard displayed on the display device is shown in FIG. 14. The method 1000 then ends.

FIG. 11 is a flowchart illustrating a method 1100 for performing risk score calculation with a risk score model. Method 1100 may be implemented with a computing device communicatively coupled to a cybersecurity intelligence and asset management system, which may be an embodiment of the cybersecurity intelligence and asset management system 302 of FIG. 3. Method 1100 may be carried out according to instructions stored in non-transitory memory and executed by one or more processors of the computing device.

At 1102, the method 1100 includes receiving enterprise data from a data aggregator, vulnerability data from external sources, and internal data from one or more endpoint devices of an enterprise network. The enterprise data and internal data may be included in an XML file generated by the data aggregator, such as the first XML document described above with respect to FIG. 10. The data aggregator may be an embodiment of the data aggregator 206 of FIG. 2. The external data may be included in an XML file generated by a web crawler, such as the second XML described above in FIG. 10. The web crawler may be an embodiment of the web crawler described in FIG. 3.

At 1104, the method 1100 includes entering unstructured vulnerability data and enterprise data into a natural language processing (NLP) model. The XML file generated by the data aggregator and the XML generated by the web crawler may be processed by the NLP model, similar to FIG. 10. As described in FIG. 6, the NLP model, which may be an Xgboost model, is trained with a set of annotated unstructured vulnerability data, a respective annotation for a string of annotated unstructured vulnerability data being a ground truth topic, a ground truth phrase, or a ground truth entity associated with a particular vulnerability of the set of annotated unstructured vulnerability data. In this way, the NLP model is trained to identify and extract topics, phrases, and entities of threat text included in the vulnerability data. In some embodiments, the NLP model may also output different performance metrics including precision, recall, an F1-score, or a receiver operating characteristic (ROC) curve.

At 1106, the method 1100 includes entering the vulnerability data and enterprise data into one or more algorithms to perform a temporal and location analysis. The XML file generated by the data aggregator and the XML generated by the web crawler may be processed by the one or more algorithms, similar to the FIG. 10, to determine a most recent timestamp for each identified vulnerability and/or the global location of each identified vulnerability.

At 1108, the method 1100 includes entering internal data into an anomaly detection model trained to identify and output a node of enterprise IT assets exhibiting anomalous behavior of a user and a timestamp of the anomalous behavior. The XML file, which may include internal data collected from the one or more endpoint devices, generated by the data aggregator may be entered into the anomaly detection model. Anomalous behavior of the user may include behavior of the user that results in operation of the node that deviates from a normal operation of the node. As described in FIG. 7, the anomaly detection model is partially trained with a set of normal internal data and validated with a set of anomalous internal data and anomaly detection model is trained during deployment of the risk score model to identify the node and the timestamp associated with anomalous behavior of the user. In some embodiments, the anomaly detection model may output a probability related to a confidence level of the anomaly detection model. In other words, the probability may indicate whether a potential anomaly detected by the anomaly detection model is within a pre-determined confidence level. The potential anomaly detected by the anomaly detection model is a true anomaly when the probability exceeds a probability threshold.

At 1110, the method 1100 includes entering internal data and other enterprise data into one or more algorithms to perform a graph network analysis to generate a graph network. The XML file, which may include internal data from the one or more endpoint devices, generated by the data aggregator may be entered and processed by the one or more algorithms of the graph network analysis to generate a network graph. The graph network analysis of the one or more nodes may be performed according to the process described above with respect to FIG. 8 to determine a degree of connectivity one node has with other nodes in the enterprise network for each node. In some embodiments, the graph network may include a CVE score for each node based on connectivity of a particular node relative to other nodes in the enterprise network and vulnerability of the respective node to cybersecurity attacks. The CVE may range from 1-10, wherein a value of 1 indicates a lower vulnerability with less severe consequences and a value of 10 indicates a critical vulnerability with greater consequences for the enterprise IT assets.

At 1112, the method 1100 includes calculating a risk score with a risk score model based on ensemble scoring, the risk score model comprising the anomaly detection model, the NLP model, and the graph network analysis. The risk score model outputs a first risk score for the anomaly detection model, a second risk score for the NLP model, and a third risk score for the graph network analysis. The first risk score is a probability wherein the probability indicates whether a potential anomaly detected by the anomaly detection model is within a pre-determined confidence level. The second risk score is the performance metric output by the NLP model, such as precision, recall, an F1-score, or an ROC curve and the third risk score is a CVE score for each node of the graph network determined during the graph network analysis. The method 1100 then ends.

FIG. 12 is a flowchart illustrating a method 1200 for implementing remediation measures based on a calculated risk score. Method 1000 may be implemented with a computing device communicatively coupled to the cybersecurity intelligence and asset management system, which may be an embodiment of the cybersecurity intelligence and asset management system 302 of FIG. 3. Method 1200 may be carried out according to instructions stored in non-transitory memory and executed by one or more processors of the computing device.

At 1202, the method 1200 includes receiving a first risk, a second risk score, and a third risk score from a risk score model, the first risk score output from an anomaly detection model, the second risk score output from a natural language processing (NLP) model, and the third risk score output from a graph network analysis. As described in FIGS. 10 and 11, the threat remediation policy includes a different set of remediation measures for the first risk score, the second risk score, and the third risk.

In particular, a first set of remediation measures are implemented in response to the first risk score exceeding a probability threshold, a second set of remediation measures are implemented in response to the second risk score exceeding a performance metric threshold, and a third set of remediation measures are implemented in response to a third risk score exceeding a CVE score threshold. The different sets of remediation measures are not implemented when the threshold values for the probability, the performance metric, and the CVE score do not exceed pre-determined threshold values.

At 1204, the method 1200 includes implementing a first set of remediation measures of the threat remediation policy in response to a first risk score exceeding a probability threshold. In some embodiments, the probability threshold may be selected to prevent false positives and false negatives. As one example, the probability threshold may be 80%. Therefore, the first risk score with a value exceeding 80% may cause the cybersecurity intelligence and asset management system to implement the first set of remediation measures. The first set of remediation measure may include detecting and flagging analogous logs, preventing a user or a network from accessing network resources, and alerting the user of incident log details and an interpretation of the incident log details and recommending actions At 1206, the method 1200 includes implementing a third set of remediation measures of the threat remediation policy in response to a second risk score exceeding a performance metric threshold. The performance metric threshold may be a pre-determined value for precision, recall, an F1-score, or a receiver operating characteristic (ROC) curve depending on the embodiment of the present disclosure. Therefore, the second risk score with a value exceeding a pre-determined value may cause the cybersecurity intelligence and asset management system to implement the second set of remediation measures. The second set of remediation measures may include detecting and flagging text based on identified topics from the NLP model and alerting the user of text details and an interpretation of the text details and recommending actions.

At 1208, the method 1200 includes implementing a third set of remediation measures of the threat remediation policy in response to a third risk score exceeding a CVE score threshold. The CVE score threshold may be a pre-determined between 1 and 10. Therefore, the third risk score with a value exceeding a pre-determined CVE score may cause the cybersecurity intelligence and asset management system to implement the third set of remediation measures. The third set of remediation measure may include detecting and flagging risky nodes, preventing the user or the network form accessing network resources; and alerting the user of node details and an interpretation of the node details and recommending actions. The method 1200 then ends. It may be understood that the remediation measures may be implemented automatically or semi-automatically depending on the reliability of the data source used to determine the first risk score, the second risk score, and the third risk score.

As illustrated in FIG. 13A, FIG. 13B, and FIG. 13C, a pictorial diagram on a time scale 1300 for identifying cybersecurity threats and implementing remediation measures according to reliable data sources. In particular, FIG. 13A illustrates a first threat scenario in a plurality of threat scenarios wherein a critical threat is identified based on information from an external data source. FIG. 13B illustrates a second threat scenario in the plurality of threat scenarios wherein a critical threat is identified based on information from an unstructured data source. FIG. 13C illustrates a third threat scenario in the plurality of threat scenarios wherein a critical threat is identified based on malicious information gathered from an unstructured data source.

At t1, the time scale 1300 includes obtaining data regarding the enterprise system and stores data in a first database in FIG. 13A, FIG. 13B, and FIG. 13C. The data regarding the enterprise system may be obtained by various software agents via an automated process. As described above with respect to FIG. 2, the software agents gather information about the latest version of the operating system and other various software on a plurality of machines, including identifying the latest patch updates and determining if the updates have been downloaded and installed on the plurality of machines. The data obtained via the software agents is stored in the first data base. The first database may be a data aggregator, such as a NoSQL, that parses the data stored in the data aggregator to identify relevant data and outputs a data file, including an XML file.

At t2, the time scale 1300 includes obtaining threat data from various data sources in FIG. 13A, FIG. 13B, and FIG. 13C. Threat data may be obtained from various data sources, including social media and media data sources, external sources, and other data sources via an automated process. Examples of the various data sources are illustrated above with respect to FIG. 2. The threat data gathered from the social media and media data sources in addition to other data sources may include unstructured data. The unstructured data may include strings of texts from various social media websites, blogs, discussion forums, and the like. The strings of text may contain information regarding potential vulnerabilities in an existing system of the enterprise network. Information from unstructured data may be considered reliable or fraudulent. Reliable information refers to true, existing vulnerabilities in the existing system of the enterprise network that may be remedied by solutions described in the unstructured data. Fraudulent or malicious information refers to false vulnerabilities that do not exist in the existing system of the enterprise network. As such, the solutions described in the unstructured data may be a vulnerability that an attacker may take advantage of rather than a solution to protect the existing system of the enterprise network.

At t3, the time scale 1300 includes inputting data from the first database and various sources into the cybersecurity intelligence and asset management platform in FIG. 13A, FIG. 13B, and FIG. 13C. Various software agents may input the information obtained from the various data sources into the cybersecurity intelligence and asset management platform via an automated process. In particular, the software agents may input various social media posts and comments, news articles, blog posts and comments, forum posts in a thread, website pages, and the like. Further, software agents may input information obtained from global data asset databases in the form of html, csv, pdf, and XML files.

At t4, the time scale 1300 includes analyzing data to determine a threat score and remediation measure via the cybersecurity intelligence and asset management platform in FIG. 13A, FIG. 13B, and FIG. 13C. Strings of text in unstructured data may be subjected to natural language processing algorithms to identify threat related information via text mining, topic modeling, scoring, and named entity recognition (NER) via an automated process. In particular, the threat related information may include key threat elements for a particular vulnerability. Data from external sources may be subjected to algorithms for temporal and location analysis to determine timestamps and location details for particular vulnerabilities via an automated process. Automated algorithms for a graph network analysis may be performed to identify relationships between a vulnerable software and other software that may be vulnerable, and vulnerable devices and other devices that may be vulnerable. In this way, nodes in the enterprise network with vulnerabilities or the potential for vulnerabilities may be identified. Accordingly, each node is assigned a CVE score (e.g., ranging from 1 to 10) for a particular vulnerability. By combining the analyses, a risk score may be calculated and a threat remediation policy may be developed based on the analysis.

Turning to FIG. 13A, at t5, the time scale 1300 includes identifying a critical vulnerability from an external data source via the cybersecurity intelligence asset management platform. The critical threat vulnerability from the external data source may be identified based on the analyses described above. A critical threat vulnerability may have a relatively high node CVE score and/or may have an extended connection network within the enterprise network which may result in infection of the plurality of devices in the enterprise network. Additionally, the external data source may provide a remediation measure for the critical threat vulnerability, such as a patch that may be downloaded and installed on at least one device in the plurality of devices in the enterprise network.

At t6, the time scale 1300 includes sending remediation measures to address threats to a second database and implementing the remediation measures to the enterprise system via software agents. As described above, remediation measures for an enterprise system may be provided by the external sources. In this way, the remediation measures may be stored in the second database that may be accessed by various software agents. The software agent may access the second database to implement the remediation measure, which may include downloading and installing a particular patch for the critical threat vulnerability. Since the remediation measures may be accurate within a ninety percent confidence level as the information originates from reliable and trustworthy data sources, the process to send the remediation measures to a database and implement them via software agents may be an automated process.

Turning to FIG. 13B, at t5, the time scale 1300 includes identifying a critical vulnerability from an unstructured data source via the cybersecurity intelligence asset management platform and human intervention. The critical threat vulnerability from the unstructured data source may be identified based on the analyses described above. A critical threat vulnerability may have an extended connection network within the enterprise network which may result in infection of the plurality of devices in the enterprise network. Additionally, the unstructured data source may provide a remediation measure for the critical threat vulnerability, such as a patch that may be downloaded and installed on at least one device in the plurality of devices in the enterprise network. However, before implementing any suggested remediation measures, the analysis and remediation measures may be validated via human intervention (e.g., a semi-automated process), to ensure the identified critical threat vulnerability is credible.

At t6, the time scale 1300 includes sending remediation measures to address threats to a second database and implementing the remediation measures to the enterprise system via software agents. As described above, remediation measures for an enterprise system may be provided by the unstructured data sources. In this way, the remediation measures may be stored in the second database that may be accessed by various software agents. The software agent may access the second database to implement the remediation measure, which may include downloading and installing a particular patch for the critical threat vulnerability. Since the remediation measures may not be accurate within a ninety percent confidence level as the information originates from potentially unreliable and untrustworthy data sources, the process to send the remediation measures to a database and implement them via software agents may be a semi-automated process. The semi-automated process may include a human intervention component that determines whether remediation measures are implemented via software agents or not.

Turning to FIG. 13C, at t5, the time scale 1300 includes identifying malicious information from the unstructured data source via the cybersecurity intelligence asset management platform and human intervention. Before implementing any suggested remediation measures, the analysis and remediation measures may be validated via human intervention in a semi-automated process to ensure the identified critical threat vulnerability is credible. In the case of malicious information, the identified critical threat vulnerability is not credible, at least one of the cybersecurity intelligence and automation platform or the human intervention may alert the system in response to identifying malicious information.

At t6, the time scale 1300 includes not sending remediation measures to address threats to the second database and not implementing the remediation measures to the enterprise system via software agents. As described above, the cybersecurity intelligence and automation platform may alert the system in response to identifying malicious information. Accordingly, the human intervention component of the semi-automated process for unstructured data may prevent the suggested remediation measures from being sent to the second data base and implemented via software agents.

At t7, the time scale 1300 includes outputting analysis summaries to a dashboard for FIG. 13A, FIG. 13B, and FIG. 13C. The analysis summaries may be generated as reports in pdf format or html format via an automated process. The analysis summaries may further include a first report with high detail including various metrics and a second report with less detail than the first report. The reports may include the intelligence data such as key terms, entities, and topics from natural language processing of unstructured data, location and timestamps from the external data sources, and graphs and charts of the automated data analysis that include key threat nodes, the corresponding attributes of the key threat nodes, and how the key threat nodes influence other nodes. For FIG. 13A and FIG. 13B, the reports may include the critical threat vulnerabilities and the remediation measures implemented. In the case of FIG. 13C, the report may include source of the malicious information in the reports and the details of the malicious information.

FIG. 14 illustrates an example of a threat dashboard 1400 displayed on a display device coupled to a cybersecurity intelligence and asset management system, such as the cybersecurity intelligence and asset management system 302 of FIG. 3. The threat dashboard may be integrated with a user interface of the display device, which may be an embodiment of the display device 334. The threat dashboard may be an embodiment of the threat dashboard 226 of FIG. 2.

The threat dashboard 1400 may include a tool box 1402, an enabled devices area 1404, an operating system (OS)

types area 1406, a scanned devices area 1408, a vulnerability statistics area 1410, a vulnerability aging area 1412, a machine compliance area 1414, a graph network analysis area 1416, and an anomaly detection area 1418. The tool box 1402 includes a set of icons, buttons, or menus within the user interface. The tool box 1402 includes features for filtering, searching, data manipulation, visualization controls, settings, preferences, alerts, notifications, undo, redo and integration with other applications. The enabled devices area 1404 may display a number of endpoint devices in an enterprise network. The OS types area 1406 may display a number of machines for each OS type. For example, the OS types area 1406 may display the number of machines with a particular operating system, such as the number of machines configured with a Windows OS, the number of machines configured with a LINUX OS, and the number of machines configured with a MAC OS.

The scanned devices area 1408 may display a number of machines scanned for vulnerabilities and patches. As one example, the scanned devices area 1408 may display a number of machines scanned for vulnerabilities and a number of machines scanned for patches. The vulnerability statistics area 1410 displays a total number of vulnerabilities and a number of vulnerabilities for each vulnerability classification. In other words, the vulnerability statistics area 1410 displays a total number of critical vulnerabilities, a number of high vulnerabilities, a number of medium vulnerabilities, and a number of low vulnerabilities identified by the cybersecurity intelligence and asset management system.

The vulnerability aging area 1412 displays a chart with a number of vulnerabilities and their distribution with respect to time. The machine compliance area 1414 may display the number of enabled devices that are compliant with security standards, patch standards, and reporting standards. The graph network analysis area 1416 may display a most recent graph network generated by the cybersecurity intelligence and asset management system and the anomaly detection area 1418 may display a chart with identified anomalies in log data, normal log data, and their respective timestamps.

An example of a graph network 1500 generated from a graph network analysis is illustrated in FIG. 15. The graph network 1500 includes a plurality of nodes and illustrates the connectivity between the plurality of nodes, wherein the connectivity is indicated with lines. Each node in the plurality of nodes is labeled with an identification number. The width of the lines between connected nodes may depend on the vulnerability classification. Higher vulnerability classifications (e.g., higher risk of exposure to cybersecurity attacks) may be demarcated with thicker lines. A first node 1502 and a second node 1504 have a higher vulnerability classification due to their connectivity relative to other nodes. The higher vulnerability classification of the first node 1502 and the second node 1504 are demarcated with thicker lines that connect each of the first node 1502 and the second node 1504 to other nodes.

The technical effect of implementing remediation measures with a cybersecurity intelligence and asset management system based on a calculated risk score from a risk score model based on ensemble scoring of outputs from a natural language processing (NLP) model, an anomaly detection model, and a graph network analysis is that potential vulnerabilities of enterprise IT assets may be identified for various data sources and a severity of the potential vulnerabilities may be quantified with the calculated risk score. In this way, an enterprise may not only comply with security standards but may reduce a frequency of cybersecurity attacks on the enterprise network.

The disclosure also provides support for a system for cybersecurity asset management and automation, comprising: a user input device: a display device, a processor, and a non-transitory memory storing instructions that when executed, cause the processor to: receive a first XML file from a data aggregator communicatively coupled to one or more nodes of an enterprise network, receive a second XML file from a web crawler, enter the second XML file to a natural language processing (NLP) model trained to extract topics, phrases, and entities, perform a temporal and location analysis based on the second XML file, identify an anomaly by inputting the second XML file into an anomaly detection model, perform a graph network analysis of the one or more nodes based on the first XML file to generate a graph network, and perform a risk score calculation based on ensemble scoring of outputs from an NLP model, the anomaly detection model, and the graph network analysis, the risk score calculation comprising generating a first risk score for the anomaly detection model, a second risk score for the NLP model, and a third risk score for the graph network analysis.

In a first example of the system, the system further comprises: generating a threat remediation policy based on each of the first risk score, the second risk score, and the third risk score, and displaying the generated results on the display device. In a second example of the system, optionally including the first example, the first XML file is collected by a software agent and sent to the data aggregator and the first XML file comprises parsed enterprise data, the enterprise data being data pertaining to software, hardware, and I/O devices of the one or more nodes. In a third example of the system, optionally including one or both of the first and second examples, the web crawler collects vulnerability data and generates the second XML file comprising parsed vulnerability data, the vulnerability data including both structured and unstructured data related to cybersecurity threats.

In a fourth example of the system, optionally including one or more or each of the first through third examples, the topics, phrases, and entities are extracted from vulnerability data, the vulnerability data including threat text associated with a particular cybersecurity threat and wherein an identified anomaly comprises abnormal behavior of a user on an endpoint device. In a fifth example of the system, optionally including one or more or each of the first through fourth examples, performing the temporal and location analysis comprises analyzing time data and location data of unstructured vulnerability data included in the second XML file and outputting a third XML file comprising a most recent timestamp for each pre-determined vulnerability and/or a global location of each pre-determined vulnerability, respectively.

In a sixth example of the system, optionally including one or more or each of the first through fifth examples, performing the graph network analysis comprises entering the first XML file as input to one or more algorithms and outputting the graph network that visually indicates a connectivity between a particular vulnerability and the one or more nodes. In a seventh example of the system, optionally including one or more or each of the first through sixth examples, the one or more algorithms include degree centrality algorithms and betweenness centrality algorithms.

The disclosure also provides support for a method for calculating a risk score, comprising: receiving enterprise data from a data aggregator, vulnerability data from external sources, and internal data from one or more endpoints devices of an enterprise network, entering unstructured vulnerability data and enterprise data into a natural language processing (NLP) model trained to classify the vulnerability data as topics, phrases, and entities, the vulnerability data comprising threat text, entering the vulnerability data and enterprise data into one or more algorithms to perform a temporal and location analysis, the temporal and location analysis identifying a timestamp and location of the vulnerability data, entering internal data into an anomaly detection model trained to identify and output a node of enterprise IT assets exhibiting anomalous behavior of a user and a timestamp of the anomalous behavior, entering internal data and other enterprise data into one or more algorithms to perform a graph network analysis to generate a graph network, and calculating a risk score with a risk score model based on ensemble scoring, the risk score model comprising the anomaly detection model, the NLP model, and the graph network analysis.

In a first example of the method, anomalous behavior of the user comprises behavior of the user that results in operation of the node that deviates from a normal operation of the node. In a second example of the method, optionally including the first example, the anomaly detection model is partially trained with a set of normal internal data and validated with a set of anomalous internal data and anomaly detection model is trained during deployment of the risk score model to identify the node and the timestamp associated with anomalous behavior of the user. In a third example of the method, optionally including one or both of the first and second examples, the NLP model is an Xgboost model and the anomaly detection model is a variational autoencoder.

In a fourth example of the method, optionally including one or more or each of the first through third examples, the NLP model is trained with a set of annotated unstructured vulnerability data, a respective annotation for a string of annotated unstructured vulnerability data being a ground truth topic, a ground truth phrase, or a ground truth entity associated with a particular vulnerability of the set of annotated unstructured vulnerability data. In a fifth example of the method, optionally including one or more or each of the first through fourth examples, the risk score model outputs a first risk score for the anomaly detection model, a second risk score for the NLP model, and a third risk score for the graph network analysis.

In a sixth example of the method, optionally including one or more or each of the first through fifth examples, the first risk score is a probability, the probability indicating whether a potential anomaly detected by anomaly detection model is within a pre-determined confidence level. In a seventh example of the method, optionally including one or more or each of the first through sixth examples, the second risk score is a performance metric such as precision, recall, an F1-score, or a receiving operating characteristic (ROC) curve and the third risk score is a CVE score for each node of the graph network.

The disclosure also provides support for a method for implementing remediation measures of a threat remediation policy, comprising: receiving a first risk score, a second risk score, and a third risk score from a risk score model, the first risk score being output from an anomaly detection model, the second risk score being output from an NLP model, and the third risk score being output from a graph network analysis, in response to the first risk score exceeding a probability threshold, implementing a first set of remediation measures of the threat remediation policy, in response to the second risk score exceeding a performance metric threshold, implementing a second set of remediation measures of the threat remediation policy, in response to the third risk score exceeding a pre-determined CVE score threshold, implementing a third set of remediation measures of the threat remediation policy.

In a first example of the method, the first set of remediation measure comprises detecting and flagging analogous logs, preventing a user or a network from accessing network resources, and alerting the user of incident log details and an interpretation of the incident log details and recommending actions. In a second example of the method, optionally including the first example, the second set of remediation measures comprises detecting and flagging text based on identified topics from the NLP model and alerting the user of text details and an interpretation of the text details and recommending actions. In a third example of the method, optionally including one or both of the first and second examples, the third set of remediation measures comprises detecting and flagging risky nodes, preventing the user or the network from accessing network resources, and alerting the user of node details and an interpretation of the node details and recommending actions.

As used herein, an element or step recited in the singular and proceeded with the word "a" or "an" should be understood as not excluding plural of said elements or steps, unless such exclusion is stated.

Furthermore, references to "one embodiment" or "one example" of the present disclosure are not intended to be interpreted as excluding the existence of additional embodiments that also incorporate the recited features.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments, and are not intended to be interpreted as excluding the existence of additional embodiments that also incorporate the recited features.

As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

As used herein, the term "substantially similar to" is construed to mean the same as with a tolerance for variation that a person of ordinary skill in the art would recognize as being reasonable.

As used herein, terms such as "first," "second," "third," and so on are used merely as labels, and are not intended to impose numerical requirements or a particular positional order on their objects.

The invention claimed is:

1. A method for calculating a risk score, comprising:
receiving enterprise data from a data aggregator, vulnerability data from external sources, and internal data from one or more endpoints devices of an enterprise network;
entering unstructured vulnerability data and enterprise data into a natural language processing (NLP) model trained to classify the vulnerability data as topics, phrases, and entities, the vulnerability data comprising threat text;
entering the vulnerability data and enterprise data into one or more algorithms to perform a temporal and location analysis, the temporal and location analysis identifying a timestamp and location of the vulnerability data;
entering internal data into an anomaly detection model trained to identify and output a node of enterprise IT assets exhibiting anomalous behavior of a user and a timestamp of the anomalous behavior;
entering internal data and other enterprise data into one or more algorithms to perform a graph network analysis to generate a graph network; and
calculating a risk score with a risk score model based on ensemble scoring, the risk score model comprising the anomaly detection model, the NLP model, and the graph network analysis.

2. The method of claim 1, wherein anomalous behavior of the user comprises behavior of the user that results in operation of the node that deviates from a normal operation of the node.

3. The method of claim 2, wherein the anomaly detection model is partially trained with a set of normal internal data and validated with a set of anomalous internal data and anomaly detection model is trained during deployment of the risk score model to identify the node and the timestamp associated with anomalous behavior of the user.

4. The method of claim 2, wherein the NLP model is an Xgboost model and the anomaly detection model is a variational autoencoder.

5. The method of claim 1, wherein the NLP model is trained with a set of annotated unstructured vulnerability data, a respective annotation for a string of annotated unstructured vulnerability data being a ground truth topic, a ground truth phrase, or a ground truth entity associated with a particular vulnerability of the set of annotated unstructured vulnerability data.

6. The method of claim 1, wherein the risk score model outputs a first risk score for the anomaly detection model, a second risk score for the NLP model, and a third risk score for the graph network analysis.

7. The method of claim 6, wherein the first risk score is a probability, the probability indicating whether a potential anomaly detected by anomaly detection model is within a pre-determined confidence level.

8. The method of claim 6, wherein the second risk score is a performance metric such as precision, recall, an F1-score, or a receiving operating characteristic (ROC) curve and the third risk score is a CVE score for each node of the graph network.

* * * * *